United States Patent
Lee et al.

(10) Patent No.: US 11,494,231 B2
(45) Date of Patent: Nov. 8, 2022

(54) ELECTRONIC DEVICE FOR PROCESSING BACKGROUND TASK BY USING EXTERNAL INPUT AND STORAGE MEDIUM THEREOF

(71) Applicant: Samsung Electronics Co., Ltd., Gyeonggi-do (KR)

(72) Inventors: Sungchull Lee, Gyeonggi-do (KR); Taposhi Rabeya, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 17/057,193

(22) PCT Filed: May 28, 2019

(86) PCT No.: PCT/KR2019/006361
§ 371 (c)(1),
(2) Date: Nov. 20, 2020

(87) PCT Pub. No.: WO2019/235772
PCT Pub. Date: Dec. 12, 2019

(65) Prior Publication Data
US 2021/0311783 A1      Oct. 7, 2021

(30) Foreign Application Priority Data
Jun. 8, 2018 (KR) .................. 10-2018-0066398

(51) Int. Cl.
*G06F 9/48* (2006.01)
*G06F 9/46* (2006.01)
(Continued)

(52) U.S. Cl.
CPC .............. *G06F 9/4881* (2013.01); *G06F 9/46* (2013.01); *G06F 9/461* (2013.01); *G06F 9/485* (2013.01);
(Continued)

(58) Field of Classification Search
CPC .......... G06F 9/48; G06F 9/4843; G06F 9/485; G06F 9/4881; G06F 9/4893; G06F 9/46;
(Continued)

(56) References Cited

U.S. PATENT DOCUMENTS

| 2011/0252423 A1 | 10/2011 | Freedman et al. |
| 2012/0102504 A1 | 4/2012 | Iyer et al. |

(Continued)

FOREIGN PATENT DOCUMENTS

| KR | 10-2013-0127445 A | 11/2013 |
| KR | 10-2014-0067041 A | 6/2014 |

(Continued)

*Primary Examiner* — Charles M Swift
(74) *Attorney, Agent, or Firm* — Cha & Reiter, LLC

(57) ABSTRACT

A storage medium according to various embodiments may store instructions. When the instructions are executed by a processor of a computer including an operating system which provides an activation state in which the instructions are executed in a foreground in relation to at least one application program, a suspended state in which the instructions are executed but do not perform a command in a background in relation thereto, and a background state in which the instructions are executed and perform a command in a background in relation thereto, the instructions may cause the computer to: in relation to an application program configured to perform a task, store information on the task in a memory of the computer; after a state of the application program is changed from an activation state to a suspended state, receive a push message from an outside of the computer; change the state of the application program from the suspended state to a background state, according to reception of the push message; and allow the application program to perform the task on the basis of the information on the task in the background state. Further, an electronic device according to various embodiments may be provided.

14 Claims, 17 Drawing Sheets

(51) Int. Cl.
*G06F 9/50* (2006.01)
*G06F 9/54* (2006.01)

(52) U.S. Cl.
CPC .......... *G06F 9/4843* (2013.01); *G06F 9/4893* (2013.01); *G06F 9/50* (2013.01); *G06F 9/54* (2013.01); *G06F 9/542* (2013.01)

(58) Field of Classification Search
CPC . G06F 9/461; G06F 9/50; G06F 9/448; G06F 9/54; G06F 9/542
See application file for complete search history.

(56) References Cited

U.S. PATENT DOCUMENTS

| | | |
|---|---|---|
| 2013/0067475 A1 | 3/2013 | Singh et al. |
| 2013/0091197 A1 | 4/2013 | Bar-Zeev et al. |
| 2013/0191541 A1 | 7/2013 | Kishan et al. |
| 2014/0324952 A1* | 10/2014 | Irwin .................. H04L 65/1069 709/203 |
| 2015/0317161 A1* | 11/2015 | Murphy .................. G06F 9/461 712/228 |
| 2016/0100322 A1* | 4/2016 | Ekambaram ........ G06F 11/3466 455/418 |
| 2017/0031723 A1 | 2/2017 | George |
| 2018/0295657 A1 | 10/2018 | Cho et al. |
| 2019/0108054 A1* | 4/2019 | Baker .................. G06F 9/4881 |

FOREIGN PATENT DOCUMENTS

| | | |
|---|---|---|
| KR | 10-2014-0138803 A | 12/2014 |
| KR | 10-2016-0067393 A | 6/2016 |
| KR | 10-2018-0113414 A | 10/2018 |

* cited by examiner

```
{
   "aps" : {
      "alert" : "It's a notification with custom payload!",
      "badge" : 1,
      "content-available" : 0     ~1310
   },
   "data" : {
      "title" : "Game Request",
      "body" : "Bob wants to play poker",   ~1315
      "action-loc-key" : "PLAY"
   }
}
```

FIG.13A

```
{
   "aps" : {
      "content-available" : 1    ~1320
   },
}
```

FIG.13B

```
{
   "aps" : {
      "content-available" : 1    ~1330
   },
   "message" : {
      "TASK name" : "A",
      "priority" : "high"         ~1335
   },
}
```

FIG.13C

ELECTRONIC DEVICE FOR PROCESSING BACKGROUND TASK BY USING EXTERNAL INPUT AND STORAGE MEDIUM THEREOF

CROSS-REFERENCE TO RELATED APPLICATION(S)

This application is a National Phase Entry of PCT International Application No. PCT/KR2019/006361, which was filed on May 28, 2019 and claims priority to Korean Patent Application No. 10-2018-0066398, which was filed on Jun. 8, 2018 in the Korean Intellectual Property Office, the contents of which are incorporated herein by reference.

BACKGROUND

1. Field

The present disclosure relates to an electronic device for processing a background task and a storage medium of the electronic device.

2. Description of the Related Art

Some applications of an electronic device (e.g., a smartphone) need periodic execution of an operation. For example, a health/medical application may periodically perform an operation such as detection, collection, and computation of related data, and monitoring, uploading, and downloading through interworking with an external server or a wearable device, etc.

An operating system of the electronic device may manage installed applications and control a state of the applications according to a life cycle.

SUMMARY

An operating system (e.g., a mobile operating system such as Android, iOS, etc.) of an electronic device may impose various limitations on an application in a background state to save a battery to the maximum and to lengthen an available time of the electronic device.

For example, the operating system of the electronic device may receive back a resource from the application in the background state and terminate the application anytime. The operating system of the electronic device may forcedly change the application in the background state to the suspended state to reduce power consumption and improve performance except for a limited scenario (e.g., for iOS, a scenario related to a Voice over Internet protocol (VoIP), audio, location tracking, content downloading, and updates from external accessories). The application changed to the suspended state may not process an event including the use of a network, etc.

When there is no user input or a screen is off for a specific time, the electronic device may be changed from a normal state to an idle state (e.g., a doze mode of Android). In this case, the operating system of the electronic device may not perform an essential task because of limiting resource use and battery consumption of a general-purpose application to the maximum.

Various embodiments provide an electronic device for processing a background task and a storage medium of the electronic device, which enable the background task to be stably processed without largely increasing battery consumption or resource use, in spite of a limitation of an operating system related to the background task.

Various embodiments provide an electronic device for processing a background task and a storage medium of the electronic device, which make it possible to stably process a background task that needs to be periodically performed.

Various embodiments provide an electronic device for processing a background task and a storage medium of the electronic device, which provide a seamless scenario to a user by usefully registering background tasks without an additional user interface or a separate user input for periodic data processing.

Various embodiments provide an electronic device for processing a background task and a storage medium of the electronic device, which allow a plurality of previously registered background tasks to be efficiently processed according to an appropriate order.

In a non-transient computer-readable storage medium having stored therein instructions according to various embodiments, the instructions, when executed by at least one processor of a computer including an operating system which provides, for an application program, an active state for operating in a foreground, a suspended state for operating in a background without executing a command, and a background state for operating in the background and executing a command, cause the computer to store, for an application program configured to execute at least one task on the computer, information about the task in a memory of the computer, to receive a push message from an outside of the computer after the application program is changed from the active state to the suspended state, to change the application program from the suspended state to the background state upon reception of the push message, and to cause the application program to execute the task based on the information in the background state.

An electronic device including an operating system which provides, for an application program, an active state for operating in a foreground, a suspended state for operating in a background without executing a command, and a background state for operating in the background and executing a command according to various embodiments includes a communication circuit, a processor, and a memory. The memory stores instructions that, when executed, cause the processor to store, for an application program configured to execute at least one task on the electronic device, information about the task in the memory, to receive a push message from an outside of the electronic device through the communication circuit after the application program is changed from the active state to the suspended state, to change the application program from the suspended state to the background state upon reception of the push message, and to cause the application program to execute the task based on the information in the background state.

According to various embodiments, a background task may be stably processed without largely increasing battery consumption or resource use, in spite of a limitation of an operating system related to the background task.

According to various embodiments, it is possible to stably process a background task that needs to be periodically performed.

According to various embodiments, a seamless scenario may be provided to a user by usefully registering background tasks without an additional user interface or a separate user input for periodic data processing.

According to various embodiments, a plurality of previously registered background tasks may be efficiently processed according to an appropriate order.

BRIEF DESCRIPTION OF THE DRAWINGS

FIGS. 13A, 13B, and 13C illustrate a program for describing a push message transmitted from outside to process a task according to various embodiments.

DETAILED DESCRIPTION

Figure 1:
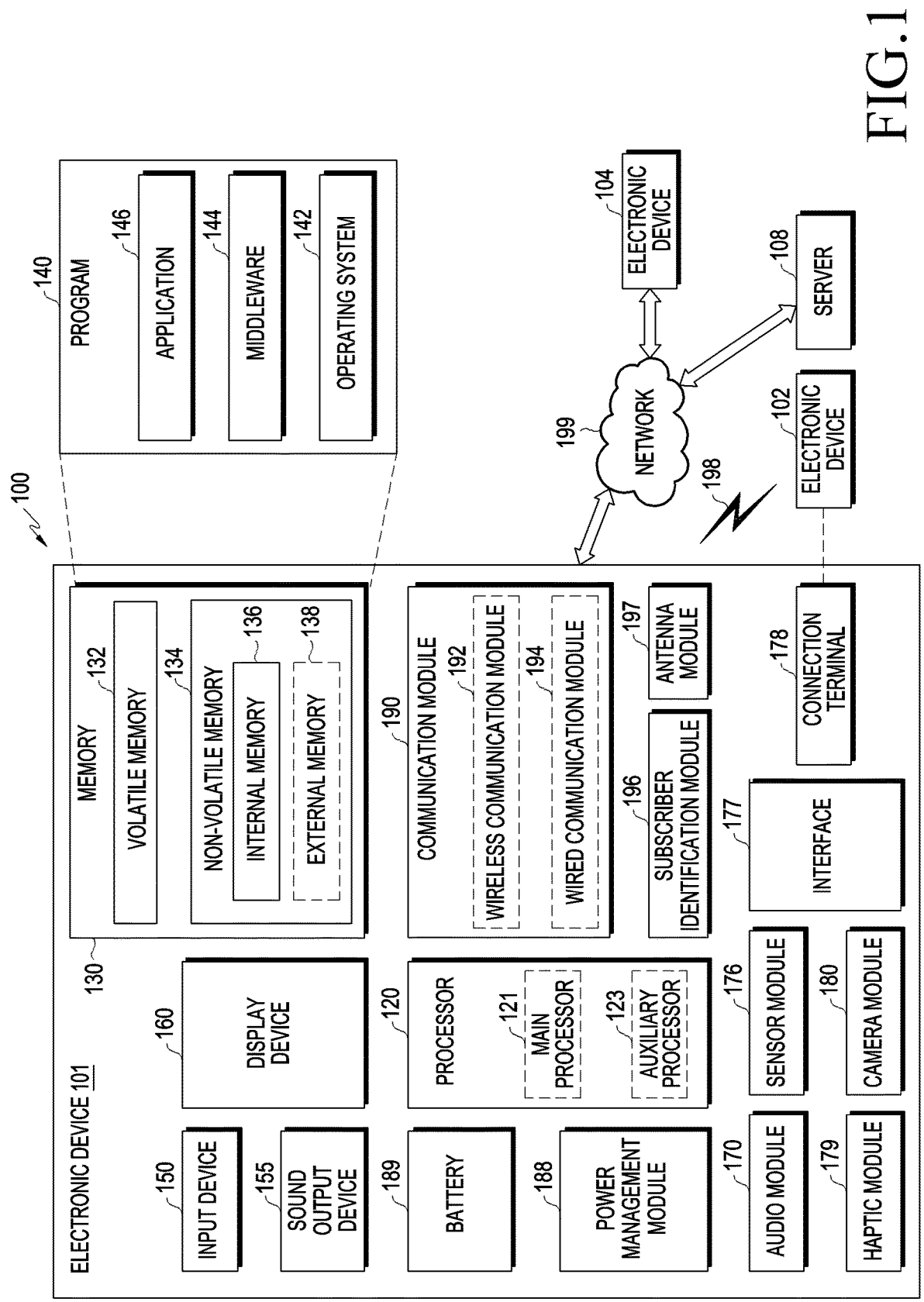
FIG. 1 illustrates a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 2001. In some embodiments, some of the components may be implemented as a single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 2001, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wireless-Fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to various embodiments may be one of various types of electronic devices, according to various embodiments of the present disclosure. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
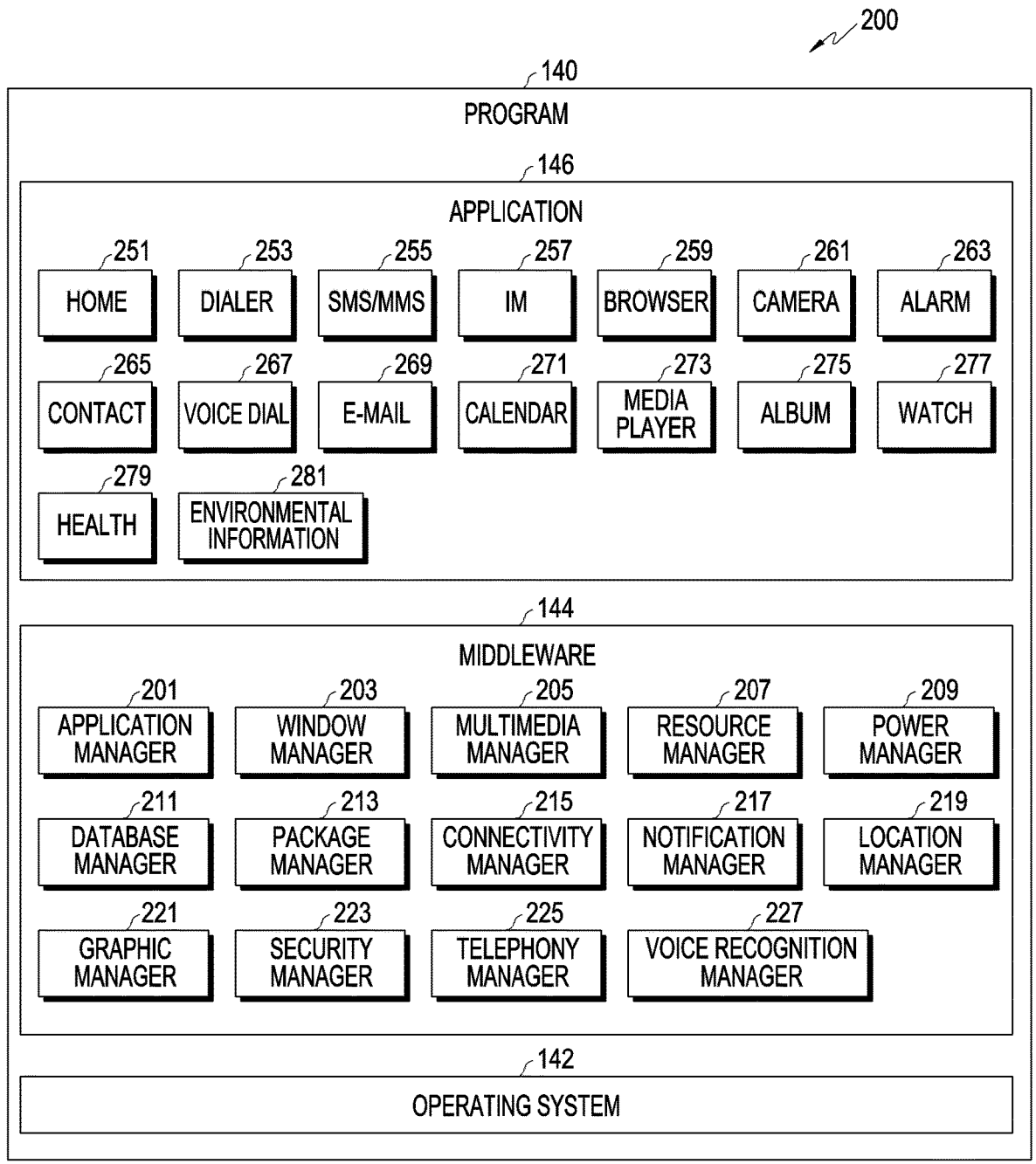
FIG. 2 is a block diagram of a programming module according to various embodiments.

FIG. 2 is a block diagram 200 of the program 140 according to various embodiments. According to an embodiment, the program 140 may include an operating system (OS) 142 to control one or more resources of the electronic device 101, middleware 144, or an application 146 executable in the OS 142. The OS may include Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, an input device 150, an sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may manage a life cycle of the applications 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 1789. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, push message, or alert). The location manager 219, for example, may manage locational information on the electronic device 101. The graphic manager 221, for example, may manage one or more graphic effects to be offered to a user or a user interface related to the one or more graphic effects.

The security manager 223 may provide, for example, system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 42.

The application 146 may include one or more applications capable of providing a function, for example, a home application 251, a dialer application 253, a short messaging service/multimedia messaging service (SMS/MMS) application 255, an instant message (IM) application 257, a browser application 259, a camera application 261, an alarm application 263, a contact application 265, a voice recognition application 267, an e-mail application 269, a calendar application 271, a media player application 273, an album application 275, a watch application 277, a health application 279 (e.g., an application for measuring biometric information such as an exercise amount, a blood sugar, etc.), or an environment information application 281 (e.g., an application for measuring air pressure, humidity, or temperature information or the like). According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, push message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus of the display device 160 or the camera module 180) of the external electronic device communicating with the electronic device 101 or some component thereof (e.g., the display device 160 or the camera module 180). The device management application, additionally or alternatively, may support installation, delete, or update of an application running on the external electronic device.

Figure 3A:
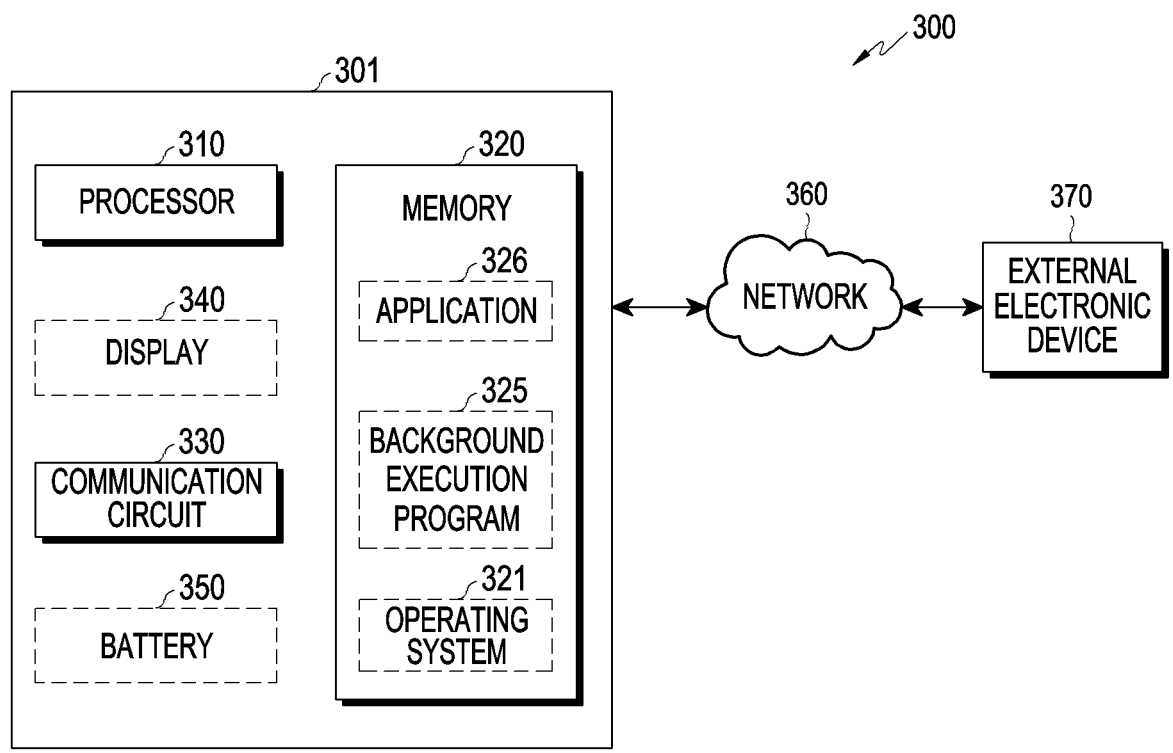
FIG. 3A is a block diagram of an electronic device according to various embodiments.

FIG. 3A is a block diagram 300 of an electronic device according to various embodiments.

According to various embodiments, an electronic device 301 may include the entire electronic device 101 illustrated in FIG. 1 or a part thereof.

Referring to FIG. 3A, the electronic device 301 may include a processor 310, a memory 320, and a communication circuit 330. The electronic device 301 may further include a display 340 and a battery 350. For example, each of the processor 310, the memory 320, the communication circuit 330, the display 340, and the battery 350 may be the processor 120, the memory 130, the communication module 190, the display device 160, and the battery 189 of FIG. 1, respectively.

The processor 310, the memory 320, the communication circuit 330, the display 340, and the battery 350 included in the electronic device 301 may be electrically and/or operatively connected to exchange signals (e.g., commands or data) with one another.

The processor 310 may communicate with an external electronic device 370 via a network 360. For example, the external electronic device 370 may be the server 108 of FIG. 1. The network 360 may be the network 199 of FIG. 1.

In an embodiment, the processor 310 may execute instructions stored in the memory 320 to manage a resource of the electronic device 301, control a state of an application 326, or process a background task.

The memory 320 may store an operating system 321, a background execution program 325, or at least one application 326. The operating system 321, the background execution program 325, or the application 326 may be loaded from the memory 320 and executed by the processor 310.

In an embodiment, the operating system 321 may be the operating system 142 of FIG. 2. The application 326 may be the application 146 of FIG. 2. In an embodiment, the operating system 321 may be a mobile operating system (e.g., iOS, Tizen, Android, Androidware, etc.).

The operating system 321 may be executed by the processor 310 to manage the resource of the electronic device 301. The operating system 321 may control the application 326 installed in the electronic device 301. The operating system 321 may control the state of the application 326 based on a life cycle of the application 326 to manage the resource. Control over the state (e.g., the life cycle, refer to FIG. 5 below) of the application 326 may differ from operating system to operating system.

In an embodiment, the operating system 321 may provide, for the application 326, an active state where the application 326 operates in a foreground, a suspended state where the application 326 operates in a background, but does not execute a command, and a background state where the application 326 operates in the background and executes a command.

A size of an available resource and/or a consumption of the battery 350 may be in order of active state>background state>suspended state.

For example, the application 326 may be executed by a user to operate in the active state in the foreground, and may be changed to the background state and then to the suspended state.

Such states of the application 326 may be an example for describing various embodiments, and may be applied, changed, or extended to other forms. Control over the state (e.g., the life cycle) of the application 326 may differ with a type of the operating system 321. For example, the suspended state may be indicated as a not-running state, an inactive state, an idle state, etc. The background state may be indicated as a running state, an active state, a wake-up state, etc.

The operating system 321 may alternately allocate a time slot for using the resource to each application 326.

The background execution program 325 may interwork with the operating system 321 to control the state of the application 326 installed in the electronic device 301 or process a previously registered background task. The background execution program 325 may be any one of an application (e.g., the application 146 of FIG. 2), a software module, a program (e.g., at least a part of the program 140 of FIG. 2), a software platform, and a library, or a combination thereof.

When an operating system layer, a middleware layer, and an application layer are assumed, the background execution program 325 may be included in an application layer or a middleware layer. The background execution program 325 may be implemented between the application layer and the middleware layer (e.g., in a framework layer).

The background execution program 325 may store instructions to provide a common basic structure of the applications 326 or a particular operation of the individual application 326. The background execution program 325, when executed, may interwork with the operating system 321 or the applications 326 to provide a common function of the applications 326 or a particular function of the individual application 326.

In an embodiment, the background execution program 325 may be of a form of an application.

In an embodiment, the background execution program 325 may be an application of a type operating invisibly to user's eyes. For example, the background execution program 325 may be executed in the background.

In an embodiment, based on an operating system (e.g., a normal state or an idle state) of the electronic device 301 or upon reception of a push message from the outside of the electronic device 301, the state of the background execution program 325 may be changed. For example, the background execution program 325 may be changed from the background state to the suspended state when the electronic device 301 enters the idle state. Upon reception of the push message from the outside, the background execution program 325 may be changed from the suspended state to the background state to process a previously registered task in the background state for a designated time (e.g., 30 seconds). After the elapse of the designated time, the background execution program 325 may return to the suspended state from the background state.

In an embodiment, the background execution program 325 may maintain the background state at all times, regardless of the operating state (e.g., the normal state or the idle state) of the electronic device 301.

In an embodiment, the background execution program 325 may be triggered by reception of the push message from the outside and operate.

The background execution program 325 may serve as a path for processing a task of the application 326 (e.g., a general-purpose application). The background execution program 325 may have a general-purpose structure to perform an operation or a function based on a scenario of each application 326 by processing a task. The background execution program 325 may cause the state of the application 326 related to a task to be processed to be temporarily changed to the background state through the operating system 321.

The task may mean a basic unit of the application 326. The task may be a unit constituting a job of the application 326. The task may mean a minimum operation unit for which a meaningful job is possible, when a series of consecutive operations for the job are divided in detail.

Each job constituting the scenario of the application 326 may be a group of finely split tasks. For example, a first task of a health application installed in the electronic device 301 may be a consecutive combination of a first task to read a value from a sensor of the electronic device 301, a second task to store the read value, and a third task to upload the value to the external electronic device 370.

The task may mean a unit of a job, a unit of scheduling, or a unit of ownership of a resource.

The resource of the electronic device 301 may be allocated to each task. The use of the resource may be scheduled for each task. On the electronic device 301, several tasks may be performed at the same time or a plurality of tasks may alternately use the resource.

In various embodiments, for the application 326 configured to execute at least one task, the processor 310 may register the task in the memory 320 and store information about the task in the memory 320 on the electronic device 301.

The information about the task may include at least one of a period of execution of the task, a condition for execution of the task, a priority of execution of the task, or a dependency of the task on execution.

In an embodiment, the application 326 may store a task thereof and information about the task in a designated region of the background execution program 325.

After entry of the application 326 to the suspended state, the processor 310 may receive a push message from the outside of the electronic device 301 through the communication circuit 330.

For example, the application 326 may be changed from the active state of the foreground to the suspended state. The application 326 may be changed from the background state to the suspended state. The application 326 may be changed to the suspended state when the electronic device 301 is changed from the normal state to the idle state. When the electronic device 301 is changed to the idle state, most applications 326 may be changed to the suspended state at a time.

The operating state of the electronic device 301 may include the normal state and the idle state.

For example, the normal state of the electronic device 301 may be a state in which the screen of the display 340 is on, there is a user input within a specific time (e.g., 10 seconds), or an operation of a foreground application is being executed (e.g., a medium is played, a web browser is executed, etc.).

When there is no user input or the screen of the display 340 is off for a specific time (e.g., 10 seconds), the electronic device 301 may be changed from the normal state to the idle state to minimize consumption of the battery 350. The idle state may be a state in which the electronic device 301 is not actually used.

The processor 310 may differently control power consumption and/or an available resource according to the operating state of the electronic device 301. In the idle state, power consumption and/or an available resource may be extremely limited.

In the idle state, the operating system 321 of the electronic device 301 may block or limit the resource use of the application 326 or turn off the screen of the display 340 to reduce battery consumption. In the idle state, a limitation imposed by the operating system 321 on resource use and/or a background task may be strengthened when compared to the normal state.

The push message may be transmitted without a request of the user. The push message may be an external input for processing the background task. The push message may be an external input for periodically processing a task. The push message may be an external input for state change (e.g., the suspended state->the background state) of the application 326 or the background execution program 325. The push message may be an external input for periodic state change.

The push message may be intended to trigger and operate the background execution program 325. The push message may be intended to operate the background execution program 325 for a designated time (e.g., 30 seconds). The push message may be intended to periodically operate the background execution program 325.

The push message may be intended to change the background execution program 325 from the suspended state to the background state for the designated time (e.g., 30 seconds). The push message may be intended to change the background execution program 325 from the suspended state to the background state periodically (e.g., every 3 hours).

The push message may include various types or various formats of messages without a limitation of a format or a type.

The processor 310 may change the application 326 from the suspended state to the background state upon reception of the push message. The processor 310 may cause the application 326 to perform a task based on previously stored information about the task in the background state.

At least one operation of storage of the information about the task, reception of the push message, or state change and task processing of the application 326 may be performed through the background execution program 325.

The processor 310 may change the background execution program 325 from the suspended state to the background state in response to reception of the push message and cause the background execution program 325 to process a task, which is previously registered in relation to the application 326, as the background task.

Each application 326 installed in the electronic device 301 may register a task and store information about the task. In an embodiment, the application 326 may store the information about the task in the active state of the foreground. The task may be a task of an application. The task may be registered in a designated storage region at the time of initialization of the application or at the time of change of the application to the background state. When the task is registered, the information about the task may be stored together.

For a plurality of applications, information about a plurality of tasks may be previously stored in a designated storage region. Upon reception of the push message from the outside, the plurality of tasks may be processed by the background execution program 325 in the unit of a task. At least some of the plurality of background tasks may be tasks of different applications. The background execution program 325 may identify an application related to a task based on previously stored information about the task and change the application from the suspended state to the background state, thereby causing the application to process the task.

The background execution program 325 may identify information about a plurality of previously registered tasks, determine an execution order of the tasks based on information about each task, and process the tasks according to the task execution order.

Information about each task may include at least one of a period of execution of the task, a condition for execution of the task, a priority of execution of the task, or a dependency of the task on execution.

The information about the task may further include basic information for execution of the task (e.g., the number of repetitions of the task, a frequency of execution of the task, related application identification information, etc.).

The information about the task may further include user's personalized information (e.g., personal information, health information, and exercise information of the user, an application use history, etc.). For example, when the user is a diabetic man, a task related to diabetes has the highest priority, and when the user is a hypertensive patient, a task related to blood pressure measurement and data sharing has the highest priority.

As the external electronic device 370 transmits the push message to the electronic device 301, the application 326 may be changed from the suspended state to the background state to process the task.

In an embodiment, as the external electronic device 370 transmits the push message to the electronic device 301 in every first periods, the application 326 may be periodically changed from the suspended state to the background state to process the task. The external electronic device 370 may designate a transmission period of the push message.

In an embodiment, the operating system 321 of the electronic device 301 may designate an operating time of the background execution program 325 upon reception of the push message. The operating system 321 may allocate a time slot corresponding to the designated time (e.g., 30 seconds) to the background execution program 325. The background execution program 325 allocated with the time slot may process the background task of the application 326 by using the resource of the electronic device 301 for the designated time. Upon expiry of the designated time, the background execution program 325 may return the allocated time slot to the operating system 321.

In an embodiment, at least some of a plurality of tasks may be executed by the operating system 321 of the electronic device 301 for the designated time (e.g., 30 seconds).

The transmission period of the push message or the operating time of the background execution program 325 may be variably determined based on the state (e.g., a current state such as a battery remaining capacity state, device specifications, user information, a user configuration condition, etc.) of the electronic device 301.

The transmission period of the push message or the operating time of the background execution program 325 may be dynamically managed by the external electronic device 370. For example, in a low battery state where the battery remaining capacity of the electronic device 301 is less than or equal to a threshold value or for a cheap terminal having an insufficient battery capacity, the transmission period of the push message may be lengthened to reduce a task execution frequency or a use frequency of the background execution program 325, or a time allocated to the background execution program 325 may be set short.

As the transmission period of the push message and/or the operating time of the background execution program 325 may be adjusted variably, scalability applicable to various operating system (e.g., mobile operating system) and device environments may be supported.

Figure 3B:
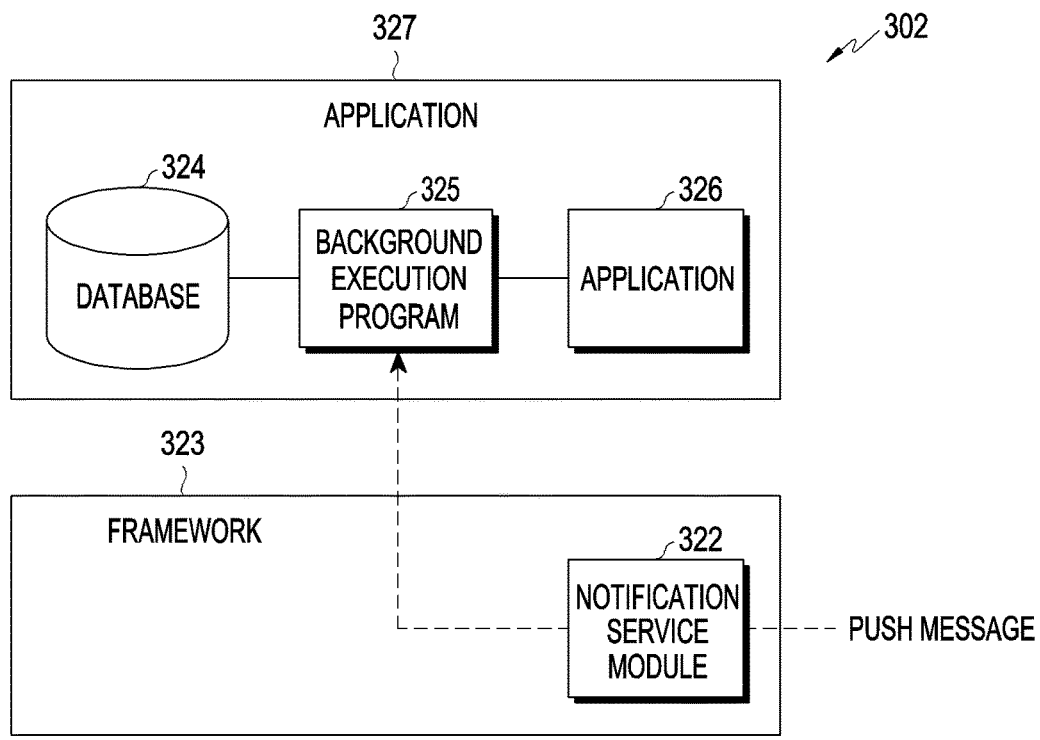
FIGS. 3B and 3C are block diagrams of a programming module including a background execution program according to various embodiments.
Figure 3C:
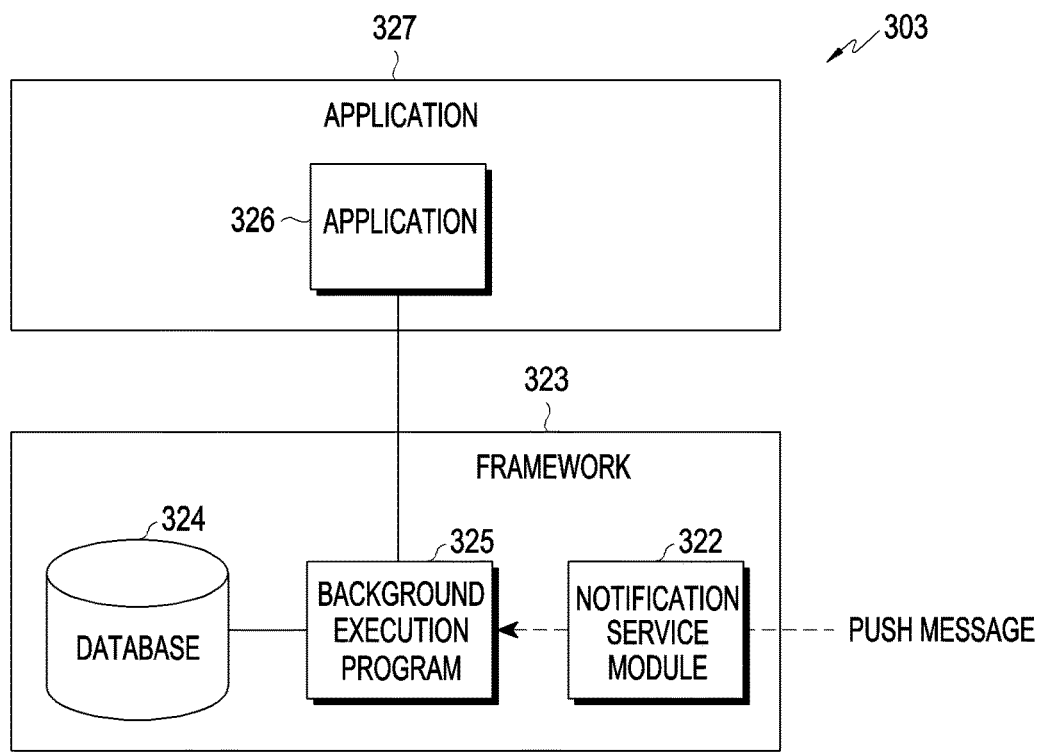

FIGS. 3B and 3C are block diagrams 302 and 303 of a programming module including a background execution program according to various embodiments.

The background execution program 325 may operate upon reception of the push message to process at least one previously registered background task. According to a type of an operating system, a limitation on a background task may vary and an installation form of the background execution program 325 for processing the background task may differ.

In an embodiment, the background execution program 325 may be included in an application layer 327 as shown in FIG. 3B (e.g., for an operating system like iOS, Android, etc.).

In an embodiment, the background execution program 325 may be included in a framework layer 323 as shown in FIG. 3C (e.g., for an open operating system like Android, etc.).

The framework layer 323 may correspond to the operating system 142 or 321 or the middleware 144, may be between the operating system 412 and the middleware 144, or a part thereof or a combination thereof.

In an embodiment, components of the background execution program 325 may be installed in a distributed manner over the application layer 327 and the framework layer 323.

A task of the application 326 (or tasks of a plurality of applications) may be registered in a database 324 through the background execution program 325. When a task is registered, information about each task may be stored in the database 324.

The application 326 may be a third-party application or a general-purpose application. The application 326 may register or delete a necessary task by using a public application programming interface (API) provided by the background execution program 325.

The background execution program 325 may receive a push message from the outside through a notification service module 322 of the framework layer 323. Upon reception of the push message, the background execution program 325 may process the task based on information about at least one task stored in the database 324. The background execution program 325 may cause the state of the application 326 having registered a task to be changed from the suspended state to the background state and thus to perform the task based on the information about the task in the background state.

In an embodiment, the background execution program 325 may identify registered tasks, determine an execution order of the tasks registered in the database 324, and process the tasks registered in the database 324 in the unit of a task according to the determined task execution order.

Figure 4:
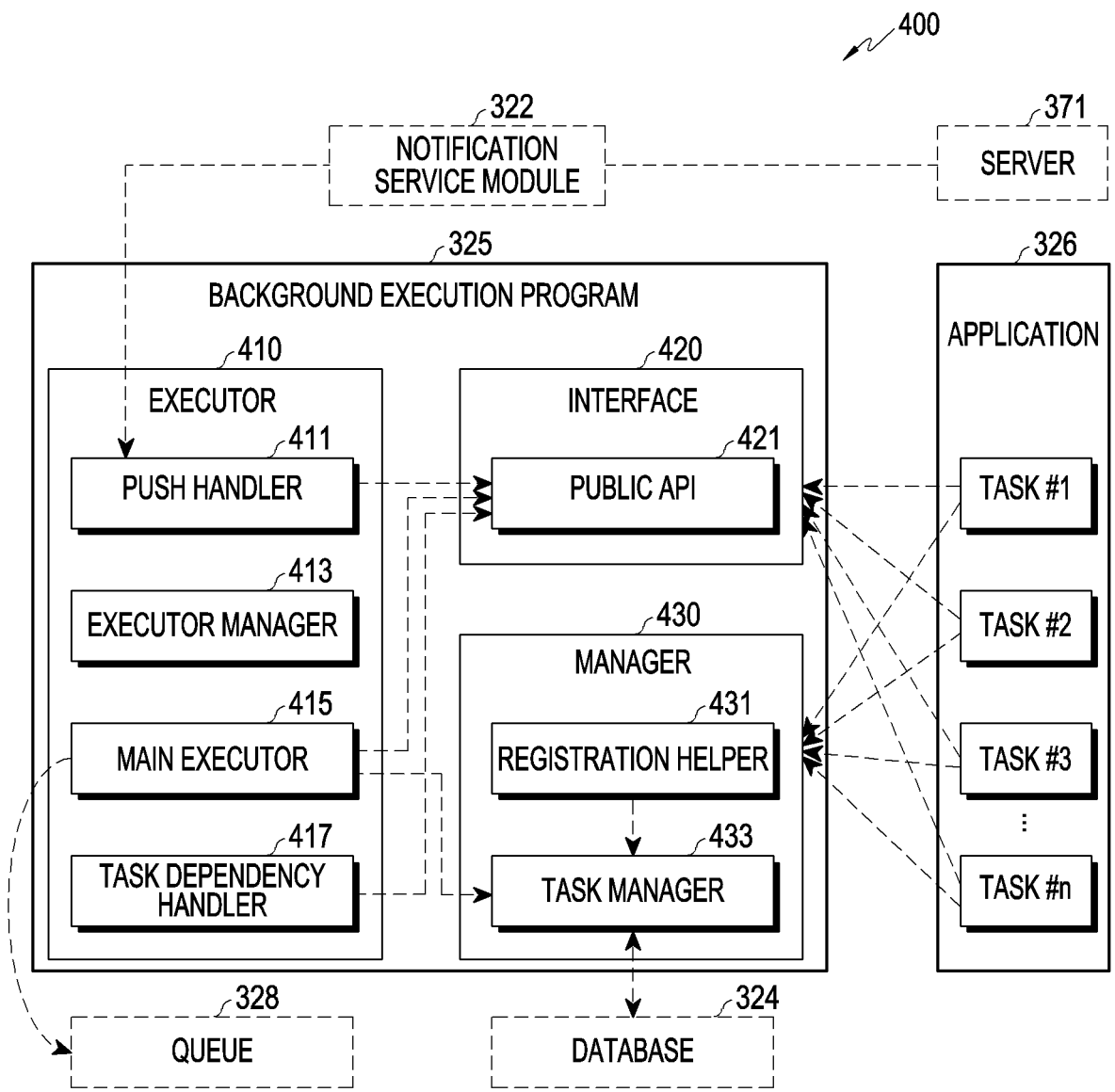
FIG. 4 is a block diagram of a background execution program according to various embodiments.

FIG. 4 is a block diagram 400 of a background execution program according to various embodiments.

As shown in FIG. 4, the electronic device 301 may include the background execution program 325 and the plurality of applications 326. The background execution program 325 and the applications 326 may be stored in the memory 320 of the electronic device 301.

In an embodiment, the background execution program 325 may be executed in the background.

In an embodiment, the background execution program 325 may be triggered by reception of the push message from the outside and operate.

In an embodiment, the background execution program 325 may be changed in state (e.g., the suspended state->the background state) upon reception of the push message from the outside.

In an embodiment, a server 371 may correspond to the external electronic device 370 of FIG. 3A.

The background execution program 325 may receive a push message from the server 371.

The background execution program 325 may interwork with each application 326, the database 324, and a queue 328 to register and process the background task. The application 326, the database 324, and the queue 328 may be stored in the memory 320 of the electronic device 301. Interworking with the application 326 may be performed through the operating system 321.

In the database 324 of the electronic device 301, at least one task may be registered as a background task and information about the task may be stored.

Each application 326 may register a task thereof (Task #1, Task #2, . . . , Task #n) in the database 324 through the background execution program 325.

While FIG. 4 shows a case where one application 326 registers a plurality of tasks (Task #1, Task #2, . . . , Task #n), each of a plurality of applications may register at least one task. For example, a first application may register Task #1 and Task #2, a second application may register Task #3, and a third application may register Task #4 and Task #5.

The tasks may be registered in the database 324. When a task is registered, information about each task may be stored together. Information about a task may include at least one of a period of execution of the task, a condition for execution of the task, a priority of execution of the task, or a dependency of the task on execution.

In an embodiment, each application 326 may register a plurality of routine tasks at the time of initialization (e.g., installation). In an embodiment, the application 326, after actually executed, may register tasks, which have not yet been completed, to complete the tasks at the time of change from the foreground to the background.

In this case, the registered tasks may independently operate and end like a thread. Each task may be configured as a unit addable to the queue 328 managed by the background execution program 325. The task registered in the database 324 may be added to the queue 328 by the background execution program 325.

Referring to FIG. 4, the background execution program 325 may include an executor 410, an interface 420, and a manager 430.

The server 371 may transmit a push message to the background execution program 325 of the electronic device 301.

The notification service module 322 of the electronic device 301 may manage the push message on the electronic device 301.

In an embodiment, the notification service module 322 may receive the push message from the outside to identify an application of the push message, and transmit the received push message to the application. The notification service module 322 may determine that the push message is a message for the background execution program 325, and transmit the push message to the background execution program 325.

The executor 410 may receive the push message from the server 371 of the outside and process tasks (Task #1, Task #2, . . . , Task #n) registered in the queue 328 in response to reception of the push message. The interface 420 may support registration or deletion of a task by the application 326. The manager 430 may register tasks (Task #1, Task #2, . . . , Task #n) of the application 326 in the database 324, store information about each task, and manage the registered tasks.

The executor 410 may include a push handler 411, an executor manager 413, a main executor 415, and a task dependency handler 417.

In an embodiment, when the operating system 321 receives the push message and transmits the received push message to the application 326, the push handler 411 may receive the push message transmitted from the external electronic device 370 through the notification service module 322 in the operating system 321 and process the received push message.

In an embodiment, when the push message is directly transmitted to the application 326 instead of the operating system 321, the push message may be directly transmitted to the push handler 411 of the background execution program 325 without passing through the notification service module 322 in the operating system 321. To secure a continuous operation, the push handler 411 may repeatedly receive the push message from the server 371 in connection with the network 360.

In an embodiment, the executor manager 413 may change a process of the registered task (Task #1, Task #2, . . . , Task #n) from the suspended state to the background state and run the main executor 415. The process may be an execution unit of one task (Task #1, Task #2, . . . , Task #n). The main executor 415 may interwork with the task manager 433 to retrieve the tasks registered in the database 324, enqueue the retrieved tasks to the queue 328, dequeue each task from the queue 328 in an appropriate order, and execute the task in the unit of a task. In an embodiment, the main executor 415 may designate an execution order of tasks stored in the queue 328 and process the tasks according to the task execution order. The task execution order may be determined based on information about each task stored in the database 324.

In an embodiment, the queue 328 may be in the form of a priority queue in which priorities of stored tasks are reset according to the task execution order and the tasks are processed one by one according to the priorities.

Information about each task may include at least one of a period of execution of the task, a condition for execution of the task, a priority of execution of the task, or a dependency of the task on execution.

When there are tasks having dependencies in the queue 328, the task dependency handler 417 may identify dependencies of the tasks to process a task that needs to be executed first among the tasks. Among tasks having interdependencies, a task having the earliest order may be processed.

Between the background execution program 325 and each application 326, the common interface 420 may exist to enable communication with each other.

The interface 420 may provide a public API 421 to allow each application 326 to register or delete a task.

The manager 430 may include a registration helper 431 and the task manager 433 to store and manage the registered tasks and information about each task in the database 324.

The executor 410, the interface 420, and the manager 430 may be allocated with the database 324 for storing tasks and the queue 328 for managing the tasks on the memory 320 from the operating system 321.

The process of each task (Task #1, Task #2, . . . , Task #n) may follow a life cycle (e.g., see FIG. 5 described below) of an application. For example, when the background execution program 325 execute a first task (e.g., Task #1) of the application 326 in the background, a state of a process of the first task (e.g., Task #1) may be changed in order of the background state->the suspended state->a not-running state according to the life cycle of the application 326.

Figure 5:
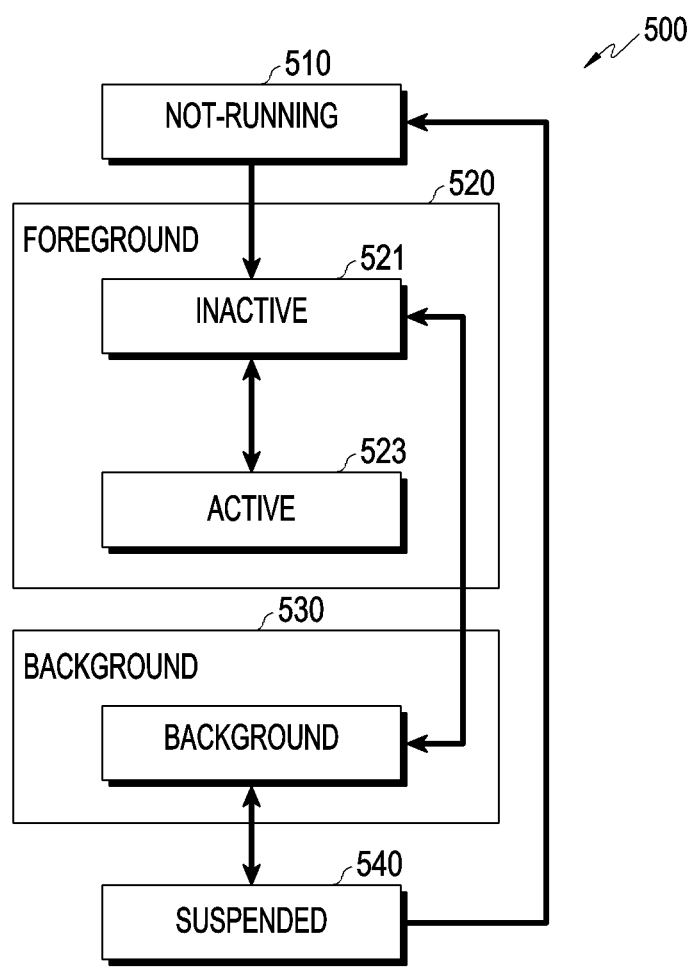
FIG. 5 is a conceptual diagram illustrating a state change of an application in an electronic device according to various embodiments.

FIG. 5 is a conceptual diagram 500 illustrating a state change of an application in an electronic device based on a life cycle of the application, according to various embodiments. State control (life cycle) of the application illustrated in FIG. 5 is an example, and may differ with an operating system.

The application may operate as a foreground application or a background application.

The foreground application may be an application being used by the user. The foreground application may be an application to be executed with a high priority. The operating state of the foreground application may be displayed on a current screen of the electronic device 301 and may be shown to the user. The foreground application may execute operations corresponding to a user input.

The background application may be an application that is not used. The background application may be an application to be executed with a low priority. The background application may not be displayed on the current screen of the electronic device 301 and may be executed invisibly to the user's eyes.

In the electronic device 301, the state of the application may change according to the life cycle of the application, as shown in FIG. 5. In an embodiment, the processor 310 of the electronic device 301 may execute the operating system 321 stored in the memory 320 and control the life cycle of the application through the operating system 321.

Referring to FIG. 5, the application may have five states as shown in FIG. 5 under control of the operating system 321 (e.g., a mobile operating system).

The operating system 321 of the electronic device 301 may provide, for the application, an active state 523 where the application 326 operates in a foreground, a suspended state 540 where the application 326 operates in a background, but does not execute a command, and a background state 530 where the application 326 operates in the background and executes a command.

The state of the application may be roughly divided into a not-running state 510, a foreground state 520, the background state 530, and the suspended state 540. The foreground state 520 may be a state where the application is displayed on the current screen of the electronic device 301 and is being executed in the foreground. The background state 530 may be a state where the application is being executed in the background without being displayed on the current screen of the electronic device 301.

For example, when the user executes the application in the not-running state 510 and presses a home button, the state of the application may change in an order of "the non-running state 510->the active state 523->the inactive state 521->the background state 530->the suspended state 540".

The not-running state 510 may be a state where the application is not executed or is terminated.

The inactive state 521 may be a state where the application is being executed in the foreground, but is not capable of receiving an event.

The active state 523 may be a state where the application is being executed in the foreground and is capable of receiving an event.

The background state 530 may be a state where the application is being executed in the background. For example, when the user presses the home button of the electronic device 301, the application being executed in the foreground may be temporarily changed into the background state 530.

When the application is changed to the background state 530, the operating system 321 may call a specific function (e.g., a delegator of iOS or a callback or listener of Android) and notify the application of change to the background state 530. The application may arrange an operating being executed and prepare for entry to the background. The application having entered the background state 530 may be changed to the suspended state 540 after a designated time (e.g., 30 seconds).

The suspended state 540 may be a state where execution of the application is stopped and the application is in a standby state. The application may be changed to the suspended state 540 after going through the background state 530 for the designated time (e.g., 30 seconds).

The application in the suspended state 540 may not operate any longer and a resource allocated to the application may be released anytime. As data is likely to be lost due to occurrence of an error when the application is changed from the foreground state 520 to the suspended state 540 through the background state 530, the designated time (e.g., 30 seconds) for which the application may store data and a current configuration may be given at the time of change to the background state 530.

The operating system 321 (e.g., the mobile operating system) may manage the life cycle of the application to reduce a battery consumption.

For example, the operating system 321 may change the state of the application from the background state 530 to the suspended state 540.

The application may have a task that needs to be periodically executed in the background. When the application is changed to the suspended state 540 without staying in the background state 530 or is changed to the not-running state 510 through the suspended state 540 under control of the operating system 321 to save power consumption, execution of the task may be limited.

In consideration of such a problem, the operating system 321 may manage life cycles of some application in an exceptional manner. Thus, those applications may maintain the background state 530 without being changed to the suspended state 540. The exceptional manner may be as below.

For example, the operating system 321 of the electronic device 301 may allow a specific application that has to provide a continuous user experience to maintain the background state 530.

When a background mode such as Audio play", "Location updates", "Newsstand downloads", "External accessory communication", "Uses Bluetooth LE accessories", "Background fetch", "remote notifications", etc., is set in the specific application, the operating system 321 may support the application to maintain the background state 530.

The background mode may be limitedly set for a particular application (e.g., a keyboard converter, a background service, a notification listener, a voice service, a text service, etc.). For an application other than the particular application (e.g., a general-purpose application), the application may have no permission to set the background mode.

In another example, some applications may have higher permission than the general-purpose application. Such an application may have permission to a foreground application even entering the background state 530. When entering the background state 530, the application may generate an on-going notification and bind the same with the foreground, thereby temporarily operating as the foreground application. The application bound with the foreground is not displayed on the current screen, but may maintain the background state 530 without being changed to the suspended state 540.

In another example, the operating system 321 may cause the application to maintain the background state 530 by adding the application to a whitelist provided therein.

In another example, a job scheduler may be used. The job scheduler may operate when a designated condition is satisfied. For example, when the electronic device 301 is being charged and there is no movement of the electronic device 301 for a specific time (e.g., 10 minutes), the job scheduler may be triggered.

The above-described exceptional manners may be limitedly applied to some applications, but may not be applied to all applications. For example, for the general-purpose application (e.g., for an application other than a particular application that may be set to the background mode or for an application bound with the foreground), the application may be changed to the not-running state 510 through the suspended state 540 without maintaining the background state 530 for a specific time. For the application, task execution may be limited and use of a resource of the electronic device 301 may be limited.

When the application is state-changed or forcedly terminated without maintaining the background state 530, a task of the application requiring periodic processing may not be executed. For example, a health or medical application may have a scenario of continuously measuring a user's health state, monitoring user's movement, and updating a corresponding value to an external server. When the application enters the suspended state 540 or the not-running state 510, task execution for the scenario may be limited, making it necessary to look for a workaround or change the scenario.

Various embodiments may implement the background execution program 325 of a general structure capable of processing tasks of various applications.

In various embodiments, upon reception of a push message from the outside, the background execution program 325 may temporarily change a state of an application that previously registers a task to the background state from the suspended state, allowing the application to execute the task in the background state.

The background execution program 325 may process background tasks, previously registered in relation to the application, in the unit of a task.

Hence, even when the application is forcedly changed from the background state 530 to the suspended state 540, the task may be completely processed according to a scenario of the application.

Figure 6A:
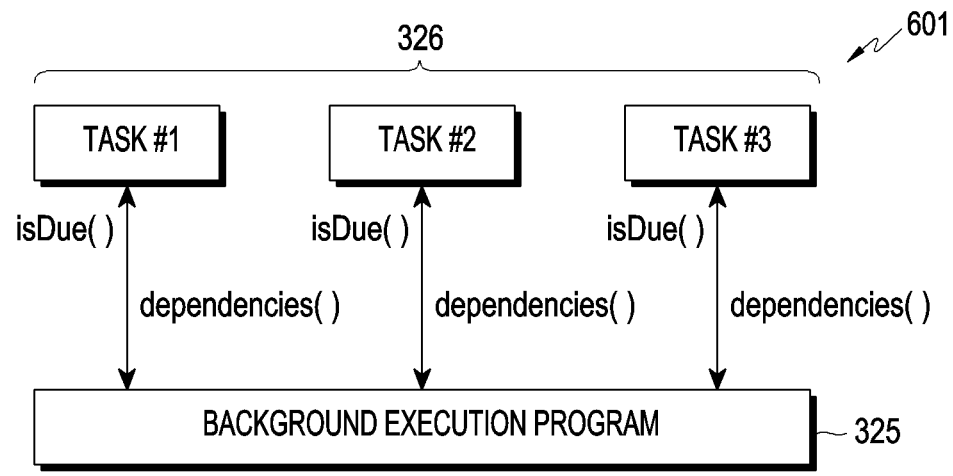
FIGS. 6A, 6B, and 7 are reference diagrams for describing an operation of processing a task registered in an electronic device according to various embodiments.
Figure 6B:
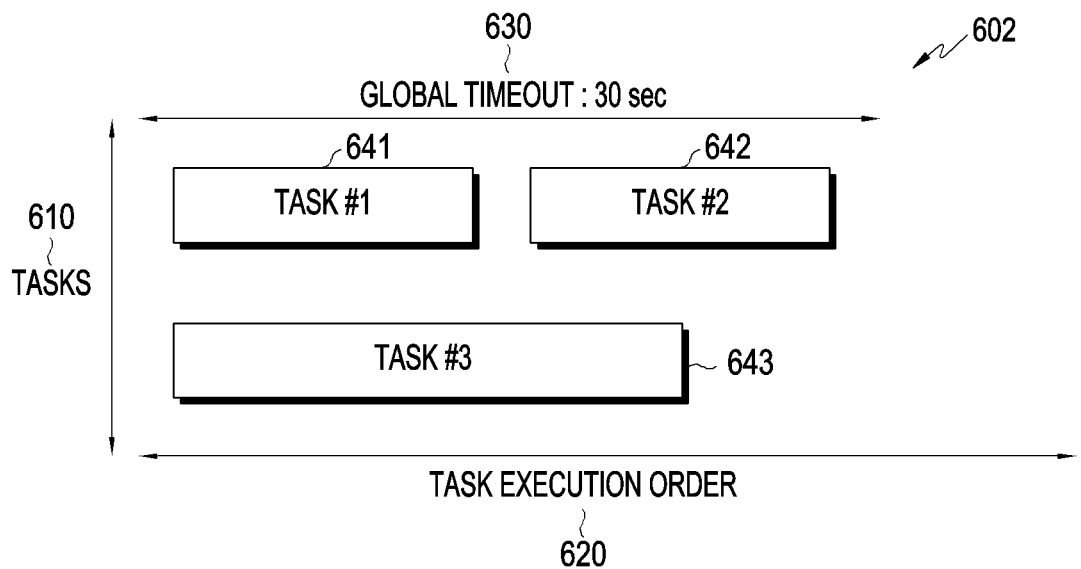
Figure 7:
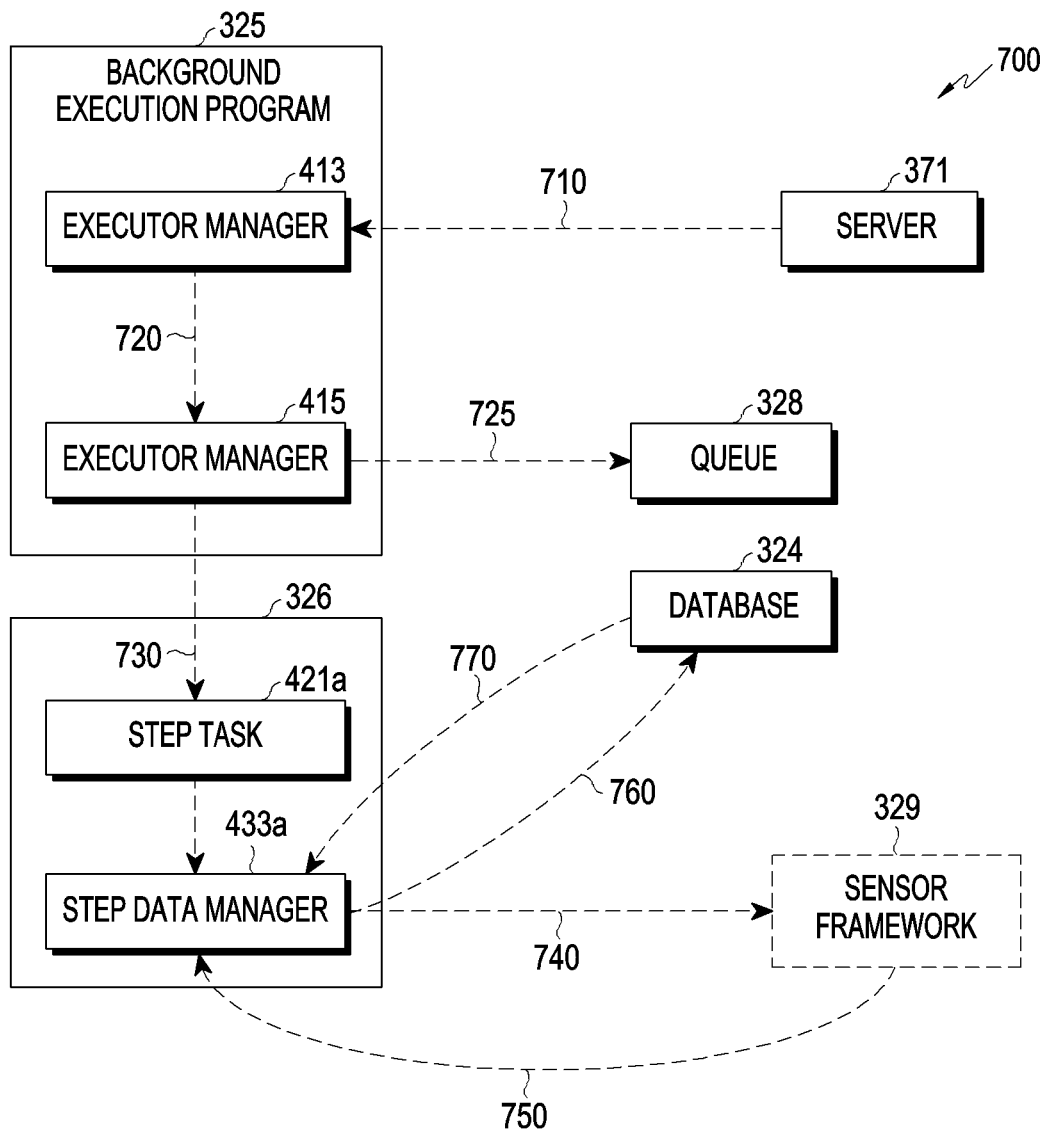

FIGS. 6A, 6B, and 7 are reference diagrams 601, 602, and 700 for describing an operation of processing a task registered in an electronic device according to various embodiments.

FIG. 6A illustrates a structure 601 in which the background execution program 325 dequeues registered tasks (e.g., Task #1, Task #2, and Task #3) of the application 326 from the queue 328.

In an embodiment, the background execution program 325 may be allocated with a time slot from the operating system 321 in response to reception of the push message from the outside and process previously registered background tasks during the allocated time slot.

The background execution program 325 may retrieve tasks of the applications 326, registered in the database 324, identify information of each task, and add each task to the queue 328. In an embodiment, the background execution program 325 may determine an execution order of tasks and re-arrange the tasks according to the determined task execution order. The task execution order may be determined based on information about each task.

The information about each task may include at least one of a period of execution of the task, a condition for execution of the task, a priority of execution of the task, or a dependency of the task on execution.

For example, a priority of execution of the task may correspond to a registration order of the task or importance of the task.

The task registration order may be different from the task execution order.

For example, when the tasks are registered in an order of Task #1, Task #2, and then Task #3, the task execution order may be determined to be an order of Task #2, Task #3, and then Task #1 based on information about the registered tasks.

The background execution program 325 may process each task added to the queue 328 based on stored information by interworking the applications 326 having registered the tasks.

After the elapse of a designated time, the allocated time slot may be returned to the operating system 321.

When the time slot is returned to the operating system 321 without completing the registered tasks, the background execution program 325 may pause execution of a task and wait for the next push message.

Upon arrival of the next push message, the background execution program 325 may execute tasks that have not yet been executed during a previous period and tasks that are newly added to the queue 328. For example, when Task #1 that has not been processed during the previous period remains and Task #2 and Task #3 are newly added, the background execution program 325 may adjust an execution order of Task #1, Task #2, and Task #3 in a current period to process Task #1, Task #2, and Task #3 in the adjusted execution order.

When there is no registered task or there is no task satisfying an execution condition in spite of reception of the push message, task execution may be skipped.

602 of FIG. 6B shows a task execution order 620 of a plurality of tasks 610 for a designated time 630.

Upon reception of a push message, the background execution program 325 may process registered tasks 610 (e.g., Task #1, Task #2, and Task #3) for the designated time 630.

The background execution program 325 may determine the task execution order 620 and dequeue the tasks 610 from the queue 328 in the determined task execution order 620.

Even when the task is registered first, the task may not be first dequeued from the queue 328 and may not be first processed.

The task execution order may be determined based on information about tasks, stored in registration of the tasks.

The information about each task may include at least one of a period of execution of the task, a condition for execution of the task, a priority of execution of the task, or a dependency of the task on execution.

The information about each task may further include user's personalized information.

The information about each task may further include basic information for execution of the task (e.g., the number of repetitions of the task, a frequency of execution of the task, related application identification information, etc.).

The information about each task may further include user's personalized information (e.g., personal information, health information, and exercise information of the user, an application use history, etc.).

The background execution program 325 may sequentially dequeue a task from the queue 328 and process the task one by one according to the task execution order 620. For example, the background execution program 325 may dequeue Task #1 from the queue 328 and process Task #1, and upon completion of processing of Task #1, may dequeue Task #2 from the queue 328 and process Task #2.

For example, the task execution order 620 may be determined based on priorities of tasks. In this case, among tasks registered in the queue 328, a task having a higher priority may be processed first. For example, even when the tasks are registered in an order of Task #1, Task #2, and then Task #3, Task #3, Task #1, and then Task #2 may be executed in that order when the priorities of the tasks are Task #3>Task #1>Task #2.

In another example, the task execution order may be determined based on a dependency. When there are tasks having dependencies in the queue 328, a task that needs to be executed first among the tasks may be processed. Among tasks having interdependencies, a task having the earliest order may be processed.

For example, in FIG. 6B, it may be assumed that Task #1 641 of reading a value from a sensor and Task #2 642 of uploading a value read from the sensor are registered. As execution of uploading in the absence of the read value may cause a waste of a resource, Task #2 642 may have a dependency on Task #1 641 of reading the value from the sensor. Thus, in consideration of the dependency, Task #1 641 may be processed first and then Task #2 642 may be processed.

Task #3 643 having no dependency may be processed in parallel by using a thread.

FIG. 7 shows an operation 700 of reading step data from the sensor and inserting the read thread data into the database 324.

For example, the user may set a mission to win when the user reaches a target step number first by competing with a colleague in the application 326 installed in the electronic device 301.

In this case, for the mission, the application 326 may have a scenario of periodically obtaining a user's step number from the sensor, transmitting the user's step number to the server 371, being synchronized with the server 371, receiving a result of comparison with a colleague's step number from the server 371, and storing the result.

The server 371 may transmit a push message to the background execution program 325 of the electronic device 301 or collect data by interworking with the application 326.

In an embodiment, a message transmission function and a data collection function may be provided through one server 371. In an embodiment, a server for the message transmission function and a server for the data collection function may be separated.

An operation corresponding to the scenario may be, for example, as below.

During a user's exercise, the operating state of the electronic device 301 may be changed from the normal state to the idle state to reduce battery consumption. In the idle state of the electronic device 301, the screen of the electronic device 301 may be off and most applications including the application 326 may be in the suspended state.

Upon reception of a push message from the server 371 in 710 in the idle state, the executor manager 413 of the background execution program 325 may receive the push message and drive the main executor 415 in the background in response to reception of the push message in 720.

The main executor 415 may receive a previously registered task list from the database 324 and enqueue a task in a task list to the queue 328 in 725. For example, the task may be a first task 421*a* of reading step data from the sensor. The main executor 415 may identify information (e.g., an execution period, an execution condition, a priority, an execution dependency, etc.) about the first task 421*a* included in the task list and enqueue the first task 421*a* as a background task to the queue 328.

When the first task 421*a* of reading step data is dequeued from the queue 328 and is executed, the main executor 415 of the background execution program 325 may transmit a command to read the step data to the sensor through the application 326 in 730 and 740. The main executor 415 may transmit a request for the step data to a sensor framework 329 that reads and stores a value of a sensor (a sensor for measuring a step number) of the electronic device 301 through a step data manager 433*a* that manages the first task 421*a* of the application 326, in 740.

The step data stored in the sensor may be transmitted back to the application 326 in 750 and may be inserted into the database 324 through the application 326 in 760. The step data manager 433*a* may receive the step data from the sensor framework 329 and insert the step data into the database 324 in 760, and may receive a corresponding response from the database 324 in 770.

Once the step data is inserted, the first task 421*a* may be terminated. The application 326 having registered the first task 421*a* may inform the background execution program 325 of termination of the first task 421*a* registered by the application 326. The background execution program 325 may dequeue the next second task from the queue 328 and execute the second task. The second task may also be a task that reads step data.

After all the tasks that read step data, including the first task and the second task, are processed, the main executor 415 of the background execution program 325 may process a third task of uploading the read step data to the server 371.

According to such task processing, the application 326 may support a scenario of reading step data in every specific periods and naturally competing with a partner through an exercise by periodically performing a necessary task regardless of a background limitation even in the background state or the suspended state.

FIGS. 8A, 8B, 9, 10, and 11 are flowcharts 801, 802, 900, 1000, and 1100 illustrating a task processing method according to various embodiments.

The task processing method according to various embodiments illustrated in FIGS. 8A through 11 may be performed by the electronic device 301. Each component of the electronic device 301, e.g., the processor 310 or the background execution program 325 may be configured to perform at least one operation of the task processing method according to various embodiments. At least one of the operations of the task processing method may be omitted, an order of some of operations may be changed, or other operations may be added.

Figure 8A:
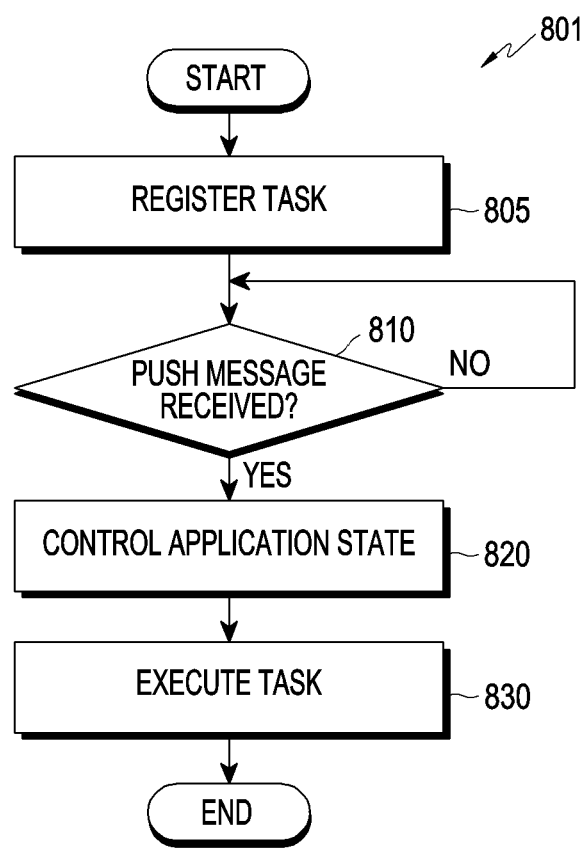
FIGS. 8A, 8B, 9, 10, and 11 are flowcharts illustrating a task processing method according to various embodiments.

Referring to FIG. 8A, a task processing method 801 according to various embodiments may include operations 805 through 830.

In operation 805, for the application 326 configured to execute at least one task, a task may be registered and information about the task may be previously stored on the electronic device 301. The information about the task may include at least one of a period of execution of the task, a condition for execution of the task, a priority of execution of the task, or a dependency of the task on execution.

In operation 810, the electronic device 301 may receive a push message from the outside of the electronic device 301 through the communication circuit 330. After the application 326 enters the suspended state (e.g., the active state of the foreground->the suspended state or the background state->the suspended state), the push message may be received. The push message may be transmitted by the external electronic device 370.

In operation 820, the electronic device 301 may control the state of the application 326 in response to reception of the push message. The electronic device 301 may change the application 326 from the suspended state to the background state upon reception of the push message.

In operation 830, the electronic device 301 may cause the application 326 to execute a task based on previously stored information about the task in the background state.

The task may be a background task. The background task may be a task processed in the background. The background task may be a task that needs to be periodically executed in the background.

The push message may be received in every first periods such that the application may execute the task in every first periods.

The transmission period of the push message may be set by the external electronic device 370.

The transmission period of the push message may be determined based on the state (e.g., a current state such as a battery remaining capacity state, device specifications, user information, a user configuration condition, etc.) of the electronic device 301.

In various embodiments, background tasks of a plurality of applications may be previously registered in a designated storage region and may be processed in the unit of a task by the background execution program 325. At least some of the plurality of applications may be different applications.

Figure 8B:
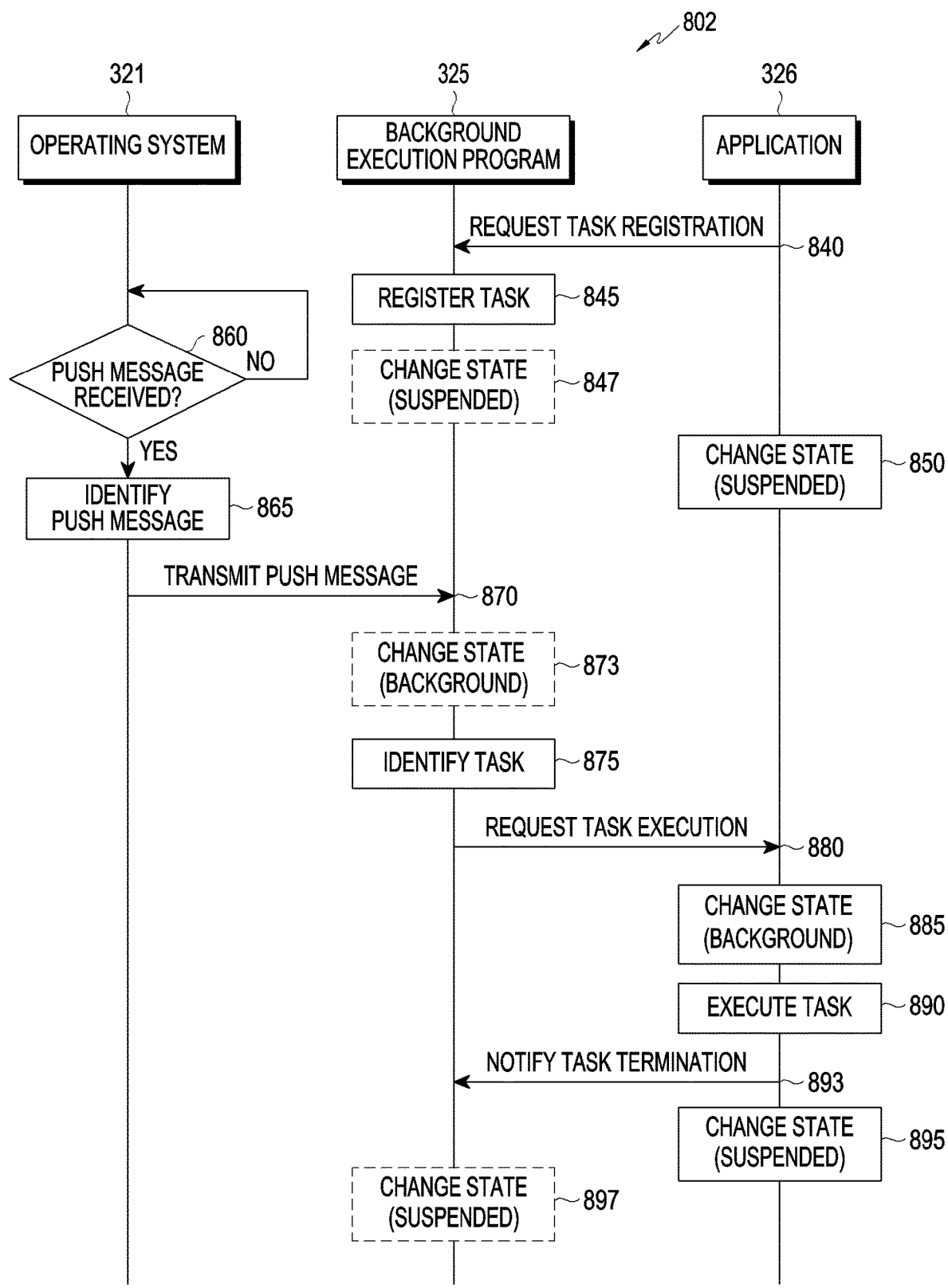

FIG. 8B illustrates an embodiment where operations of a task processing method 802 according to various embodiments are executed separately by respective execution entities of the electronic device 301.

In an embodiment, after being changed from the background state to the suspended state, the background execution program 325 may be changed to the background state to process a task upon reception of the push message from the outside.

In an embodiment, the background execution program 325 may maintain the background state without being changed to the suspended state. In this case, operation 847, operation o873, or operation 897 may be omitted.

In operation 840 of FIG. 8B, the application 326 may request the background execution program 325 to register at least one task.

In operation 845, the background execution program 325 may register the task in the database 324 at the request of the application 326 and store information about the task.

For example, operations 840 and 845 of registering a task may be performed when the application 326 is in the active state of the foreground.

After task registration in operations 840 and 845, the background execution program 325 may enter the suspended state in operation 847. For example, the background execution program 325 may be changed to the suspended state from the background state.

In operation 850, the application 326 may enter the suspended state. For example, the application 326 may be changed from the active state of the foreground to the suspended state. The application 326 may be changed to the suspended state through the background state.

In operation 860, the operating system 321 of the electronic device 301 may receive the push message from the outside. For example, the operating system 321 may wait for reception of the push message on the electronic device 301 in the idle state.

In operations 865 and 870, the operating system 321 may identify the received push message and transmit the identified push message to the background execution program 325.

In operation 873, the background execution program 325 may be changed from the suspended state to the background state in response to reception of the push message.

In operation 875, the background execution program 325 may identify the task registered in operation 845 in the background state.

In operation 880, the background execution program 325 may request the application 326 having registered the task to execute the task. In operation 885, the state of the application 326 may be changed in response to a task execution request. In an embodiment, the application 326 may be changed from the suspended state to the background state.

Task execution may be implemented variously. A task execution manner may differ with a type of the operating system 321.

For example, the background execution program 325 may request the operating system 321 to execute a task such that the operating system 321 triggers the application 326 in the form of a notification. The background execution program 325 may execute one or more threads to process one or more tasks in one application 326. The background execution program 325 may transmit an intent to each application 326 through the operating system 321 to process tasks of the different applications 326.

In operation 890, the application 326 may execute the task in the background state based on information about the task previously stored in operation 845.

In operation 893 of FIG. 8B, the application 326 may notify the background execution program 325 to terminate the task.

In operation 895, the application 326 may return to the suspended state from the background state.

In operation 897, the background execution program 325 having received the task termination notification of the application 326 may also return from the background state to the suspended state.

Figure 9:
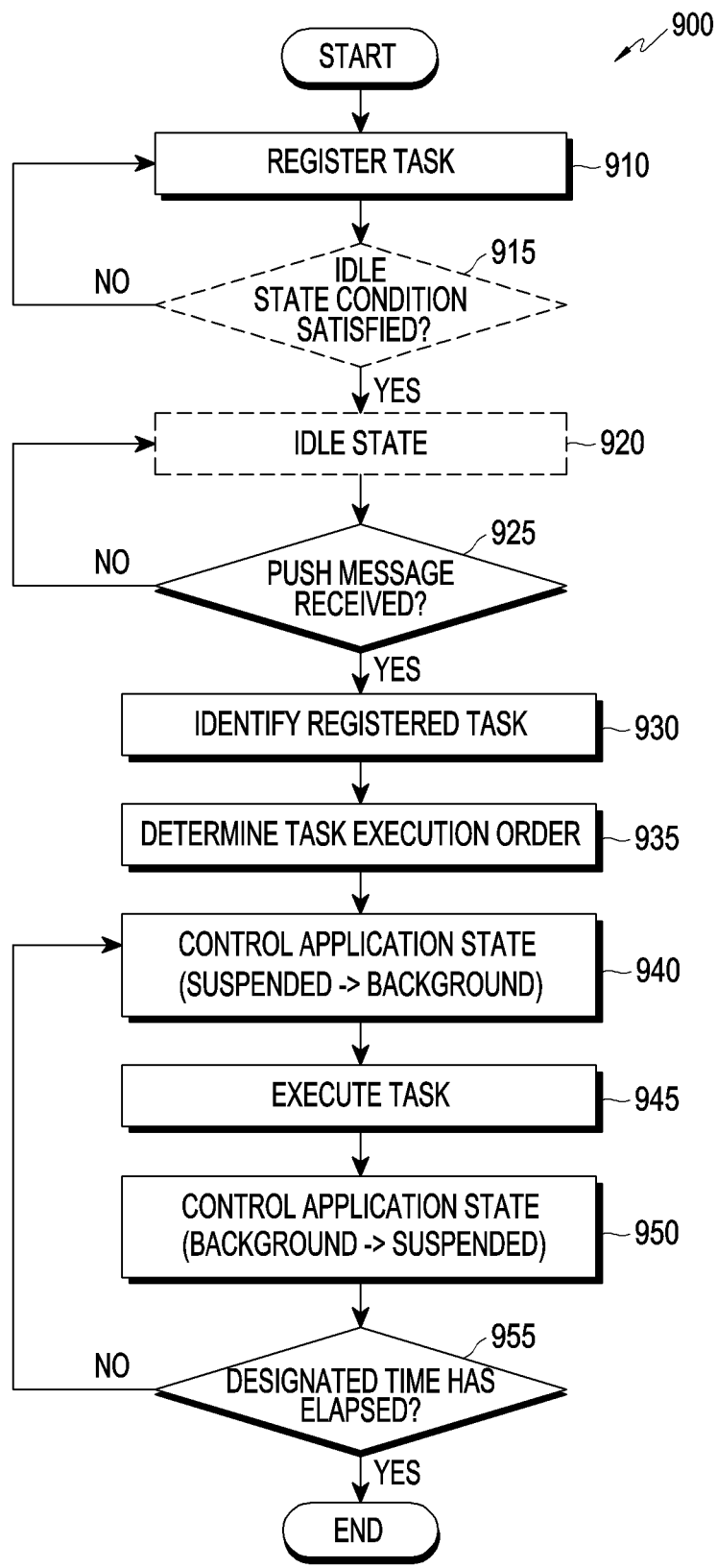

FIG. 9 illustrates an embodiment where an execution order of previously registered tasks is determined to process the tasks in the determined task execution order.

Operations 910, 925, 940, and 945 of a task processing method 900 of FIG. 9 may correspond to operations 805, 810, 820, and 830 of FIG. 8A, respectively.

Referring to FIG. 9, in operation 910, the application 326 of the electronic device 301 may register a task (e.g., a task that needs to be periodically executed) in a designated region through the background execution program 325. For example, when the application 326 is initialized or is changed to the background state 530, at least one task may be registered.

When a task is registered, information about the task may be stored. The information about the task may include at least one of a period of execution of the task, a condition for execution of the task, a priority of execution of the task, or a dependency of the task on execution.

In operations 915 and 920, the processor 310 may determine that the electronic device 301 enters the idle state. Operations 915 and 920 may be omitted according to an embodiment.

In operation 915, the processor 310 may determine whether the state of the electronic device 301 satisfies an idle state condition. For example, when a state where the screen of the electronic device 301 is off or a state where there is no event such as a user input, etc., continues for a specific time, the processor 310 may determine that the idle state condition is satisfied.

In operation 920, when the idle state condition is satisfied, the processor 310 may change the operating state of the electronic device 301 from the normal state into the idle state. When the electronic device 301 is changed to the idle state, the applications 326 being executed in the background may be changed to the suspended state 540 at a time.

In operation 925, the processor 310 may receive a push message from the external electronic device 370 through the communication circuit 330 in the idle state of the electronic device 301. When the push message is not received, the processor 310 may continuously wait for reception of the push message in the idle state. Upon reception of the push message in the idle state, the processor 310 may trigger the background execution program 325.

In operation 930, the background execution program 325 may identify a previously registered task. In an embodiment, a plurality of tasks may be previously registered. Each application may register one or more tasks. In an embodiment, tasks of a plurality of applications may be previously registered. In an embodiment, tasks of different applications may be previously registered.

In operation 935, the background execution program 325 may determine an execution order of a plurality of tasks. The task execution order may be determined based on information about each task. Information about each task may include at least one of a period of execution of the task, a condition for execution of the task, a priority of execution of the task, or a dependency of the task on execution. The information about each task may further include user's personalized information.

In operations 940 through 950, the background execution program 325 may process previously registered tasks according to the determined task execution order. In an embodiment, a plurality of background tasks may be previously registered in a designated storage region and may be processed in the unit of a task by the background execution program 325. At least some of the plurality of background tasks may be tasks of different applications.

For example, the background execution program 325 may identify the first task having the earliest task execution order among the registered tasks and request execution of the first task. In response to the execution request of the first task, the first application having registered the first task may be changed from the suspended state to the background state in operation 940 and execute the first task in the background state in operation 945. After the first application executes the first task, the first application may return to the suspended state.

In operation 955, the background execution program 325 may determine whether a designated time has elapsed.

When determining that the designated time has not elapsed in operation 955, the background execution program 325 may repeat operations 940 through 950 to process the next task according to the task execution order. The background execution program 325 may execute processing with respect to the previously registered tasks by operating until expiry of the designated time.

For example, the background execution program 325 may identify a second task having the second earliest task execution order among the registered tasks and request execution of the second task. In response to the execution request of the second task, the second application having registered the second task may be changed from the suspended state to the background state in operation 940. After the second application executes the second task in the background state in operation 945, the second application may return to the suspended state in operation 950.

When determining that the designated time has elapsed in operation 955, the background execution program 325 may terminate an operation thereof.

Figure 10:
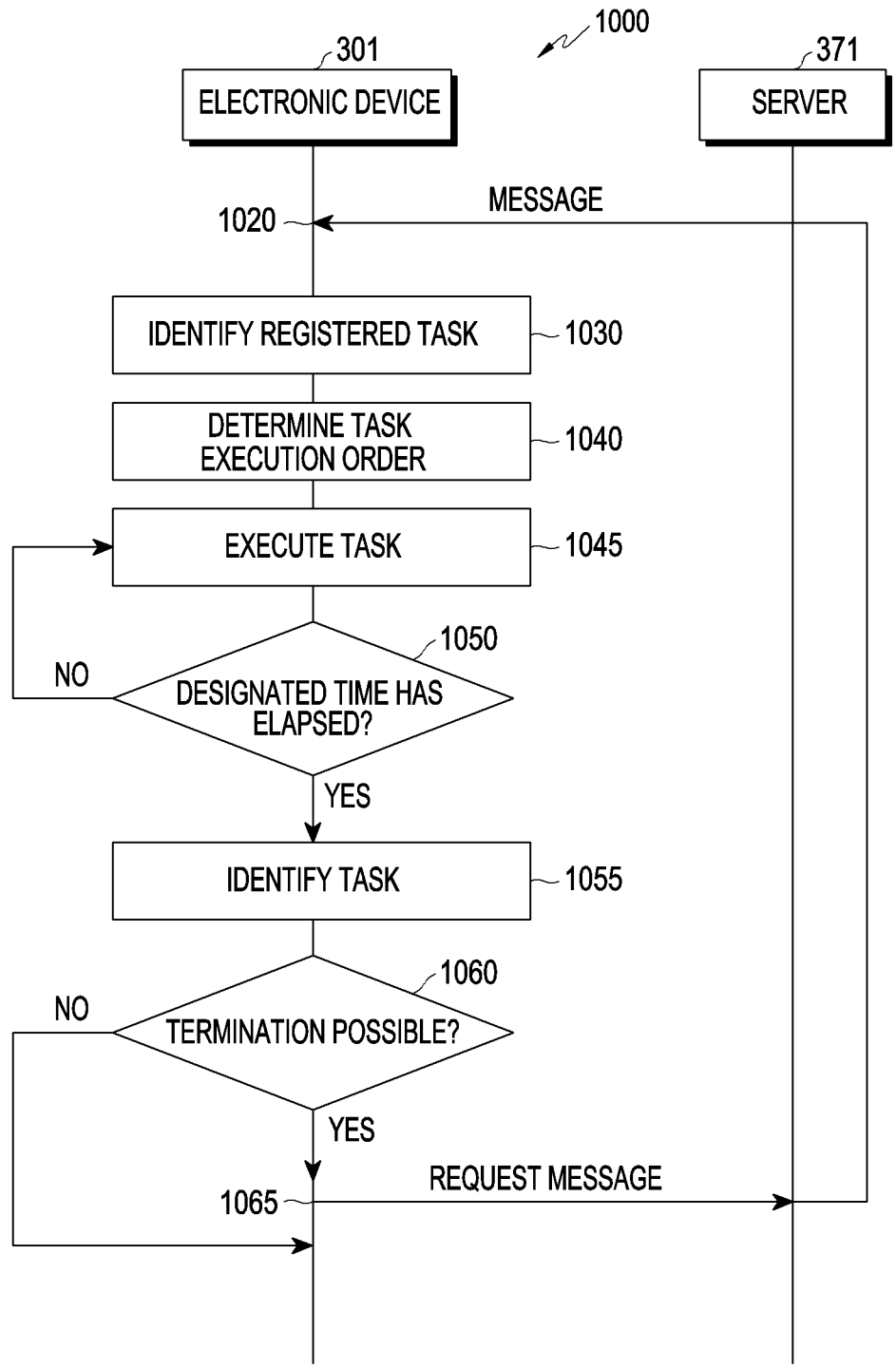

FIG. 10 illustrates an embodiment where the electronic device 301 requests the external electronic device 370 to retransmit the push message to extend a task processing time. In an embodiment, the task processing time may be an operating time of the background execution program 325.

Operations 1020, 1030, 1040, 1045, and 1050 of a task processing method 1000 of FIG. 10 may correspond to operations 925, 930, 935, 945, and 955 of FIG. 9, respectively.

In operation 1020, the external electronic device 370 may transmit a push message for changing a state of the application 326 and/or processing a background task. The push message may be periodically transmitted.

In operation 1030, the processor 310 may operate the background execution program 325 to operate during a designated time in response to reception of the push message from the external electronic device 370.

In operations 1030, 1040, and 1050, the background execution program 325 may identify registered tasks of applications, determine an execution order of the tasks, and process the tasks according to the determined task execution order.

In operations 1045 and 1050, the background execution program 325 may dequeue tasks and process them one by one according to the task execution order until the elapse of the designated time.

In operations 1055 and 1060, upon the expiry of the designated time, the background execution program 325 may identify a remaining task before terminating the operation and determine whether task processing termination is possible. For example, the processor 310 may identify the remaining task. The processor 310 may determine based on the information about the task whether immediate termination of a currently executed task is possible, whether a task remaining in the queue 328 needs to be immediately executed or has a high priority, or whether there remains a task having an attribute set to "mandatory".

When determining that task processing termination is possible, the processor 310 may return an application in the background state to the suspended state at the request of the background execution program 325 and terminate a background task processing operation.

When determining that task processing termination is not possible, in operation 1065, the processor 310 may request the external electronic device 370 to immediately retransmit the message at the request of the background execution program 325, In response to the request of the processor 310, the external electronic device 370 may return to operation 1020 to immediately retransmit the push message before the arrival of the next period.

The electronic device 301 having received the push message may perform operations 1030 through 1045 to process a non-processed task through the background execution program 325.

Figure 11:
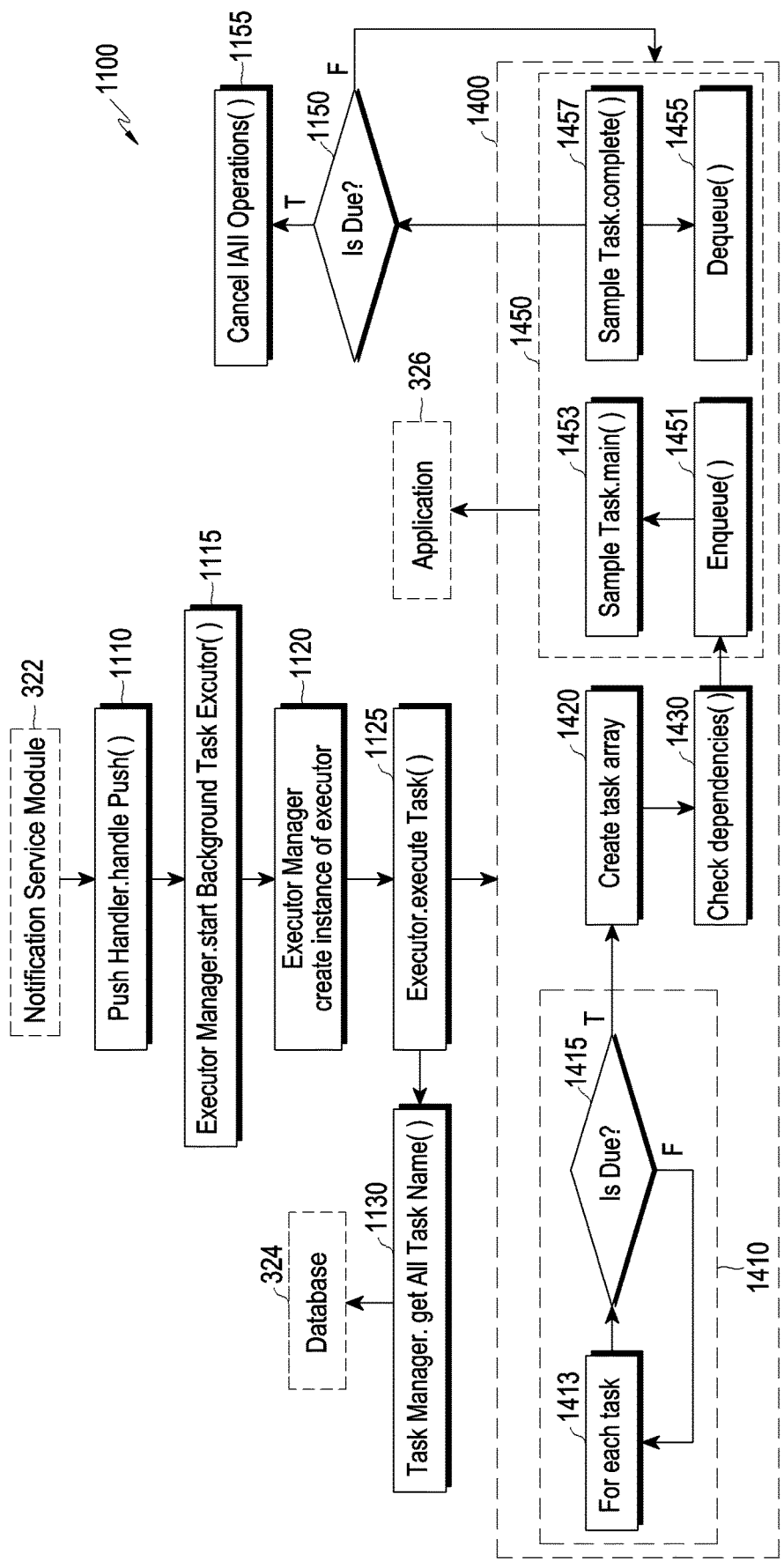

FIG. 11 is a flowchart 1100 illustrating a task processing method when the electronic device 301 reads step data from a sensor and inserts the step data into the database 324. The task processing method illustrated in FIG. 11 may be performed, for example, by the background execution program 325 illustrated in FIG. 4.

The application 326, when being initialized or being changed to the background state, may register tasks by using the interface 420 provided by the background execution program 325.

When the push message is transmitted from the external electronic device 370, task processing of the background execution program 325 may be initiated. The push handler 411 in the executor 410 may receive the push message through the notification service module 322 in operation 1110, the executor manager 413 may be initialized in operation 1115, and a process of a task may be changed in operation 1120. The change of the process may be a condition where the application 326 may operate in the background state 530 for a designated time (e.g., 30 seconds), in operation 1125.

The executor 410 may request a task list of stored tasks to and receive the same from the database 324 in operation 1130.

The tasks of the generated task list may be enqueued to the queue 328 in operation 1400, and may be dequeued from the queue 328 one by one in operation 1450.

The tasks enqueued to the queue 328 may be dequeued and processed one by one in operations 1451 and 1453, and the processed task may be deleted from the queue 328 in operations 1457 and 1455.

The executor 410 may rearrange the tasks in the task list in operation 1420.

The executor 410 may determine a task execution order based on information about each task. The information about each task may include at least one of a period of execution of the task, a condition for execution of the task, a priority of execution of the task, or a dependency of the task on execution.

For example, when the task execution order is determined, it may be considered whether a task has an execution period (e.g., weekly, daily, etc.) or whether the task has to be frequently executed each time, in relation to the task execution order.

When the task execution order is determined, a task related to an exercise may be executed when the user of the electronic device 301 is moving, in relation to a task execution condition. Otherwise, various execution conditions may be designated as task trigger conditions, such that the task may be executed when the electronic device 301 is being charged or when the remaining battery capacity is greater than or equal to a specific value. To satisfy such execution conditions, a list of tasks may be generated.

The information about each task may further include user's personalized information. As the personalized information is considered, a priority of execution of the task may also be personalized. For example, in relation to a priority, for a diabetic man, a task related to diabetes may have the highest priority. For a hypertensive patient, a task related to blood pressure measurement and data sharing may have the highest priority.

When the task execution order is determined, the foregoing priority may be considered.

In an embodiment, to set the task execution order, the background execution program 325 may check an execution period of each task in operation 1410. The background execution program 325 may reflect to the task execution order, whether an execution period of each task has arrived, in operations 1413 and 1415.

In an embodiment, when the tasks are executed, the task execution order may be determined based on a dependency of each task in operation 1430. For example, among a plurality of tasks having dependencies, a task needing to be executed first may be processed first. A task having no dependency may be processed in parallel by using a thread.

The background execution program 325 may dequeue each task from the queue 328 and execute the task according to the task execution order in operations 1451 and 1453. Upon completion of execution of a task, the next task may be dequeued from the queue 328 and executed in operations 1455 and 1457. The background execution program 325 may execute tasks registered in the queue 328 one by one while looping for each task during a designated time (e.g., 30 seconds) permitted in the operating system 321, in operation 1450.

Upon the elapse of the designated time in operation 1150, task processing of the background execution program 325 may be terminated in operation 1155. In termination of task processing, the process of the task may be changed again, which may be a condition where the application 326 may not operate in the background state 530. In an embodiment, the process may be changed from the suspended state 540 to the background state 530 in reception of the push message, and upon the elapse of the designated time (e.g., 30 seconds), the process may return to the suspended state 540.

FIGS. 12A, 12B, 12C, and 12D illustrate screens 1201, 1203, 1205, and 1207 of an application to which task processing according to various embodiments is applicable.

Various embodiments may be a general-purpose structure capable of executing a task corresponding to a scenario of each application rather than reading a specific value or executing a determined scenario. Due to such a structure, the present disclosure may be applied without a limitation to various applications (e.g., an application having a periodic scenario or a scenario performed for a long time, a health/medical application, other various general-purpose applications, etc.).

Figure 12A:
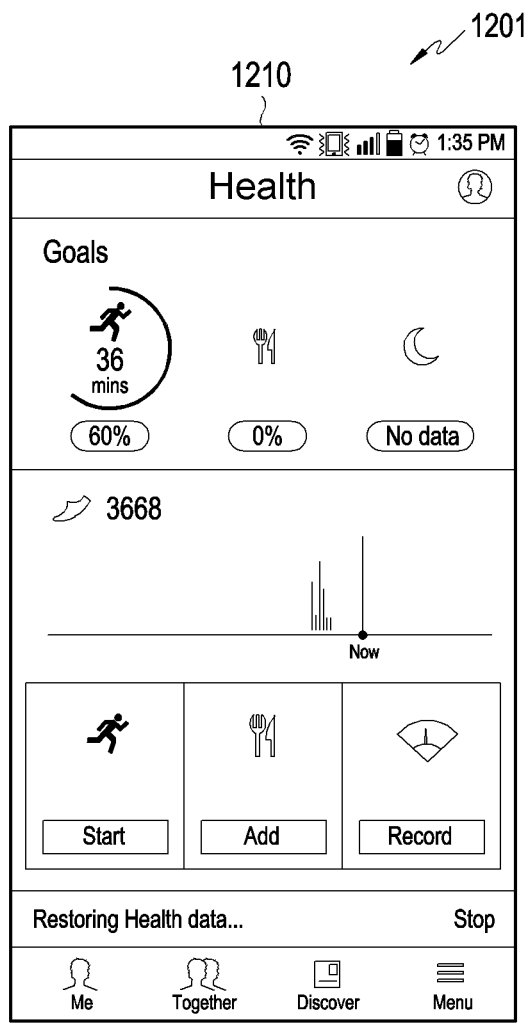
FIGS. 12A, 12B, 12C, and 12D illustrate screens of an application to which task processing according to various embodiments is applicable.

1210 of FIG. 12A illustrates a screen where initial synchronization with the external electronic device 370 has completed.

Upon entry to the suspended state during installation of the first application, the installation may be paused.

According to various embodiments, even when the first application enters the suspended state due to the push message from the outside, installation of the first application may be normally performed without a user input. The initial synchronization of the first application may be normally completed, and the entire large-volume user data stored in the external electronic device 370 may be retrieved in relation to the first application.

When the large-volume user data is stored in the external electronic device 301, the user data may be downloaded in initial installation of the first application to synchronize the electronic device 301 with the external electronic device 370. When the first application enters the suspended state without completion of downloading, the downloading may be paused without further progressing.

According to an embodiment, the first application may register a download task and may be periodically changed to the background state to complete downloading. Even when the first application is executed by the user and is not changed to the foreground state, data synchronization may be completed after a specific time.

This scenario may be applied to data downloading after the installation of the first application.

For example, in a state where a download progress bar is displayed on the screen of the electronic device 301 and downloading is progressing, even when the first application is changed to the suspended state, the downloading may be continuously performed due to registration and periodic execution of the download task, and a progress of the downloading may be displayed by the download progress bar.

Figure 12B:
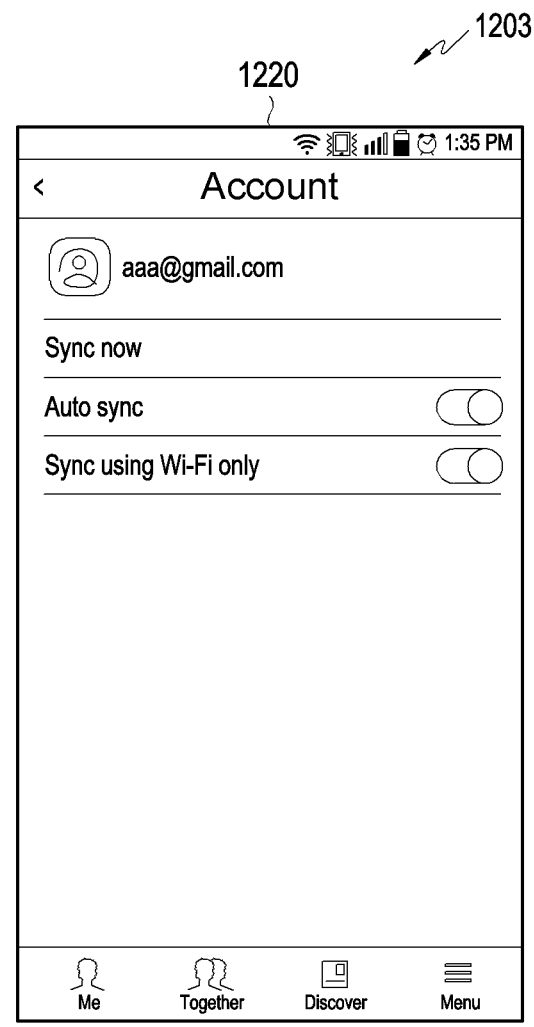

1220 of FIG. 12B illustrates a configuration screen for triggering periodic synchronization with the external electronic device 370.

When a corresponding function is set to ON by the user, synchronization with the external electronic device 370 may be periodically triggered regardless of a state of the first application. Data of the first application may be periodically transmitted to and stored in the external electronic device 370.

For example, for some operating system 321 (e.g., iOS), due to a size of a buffer storing sensor data, the sensor data stored in the buffer may be lost after a specific time (e.g., 7 days) unless the sensor data is periodically read.

According to an embodiment, as the first application using the sensor data registers the task in a designated region, this problem may be solved.

Figure 12C:
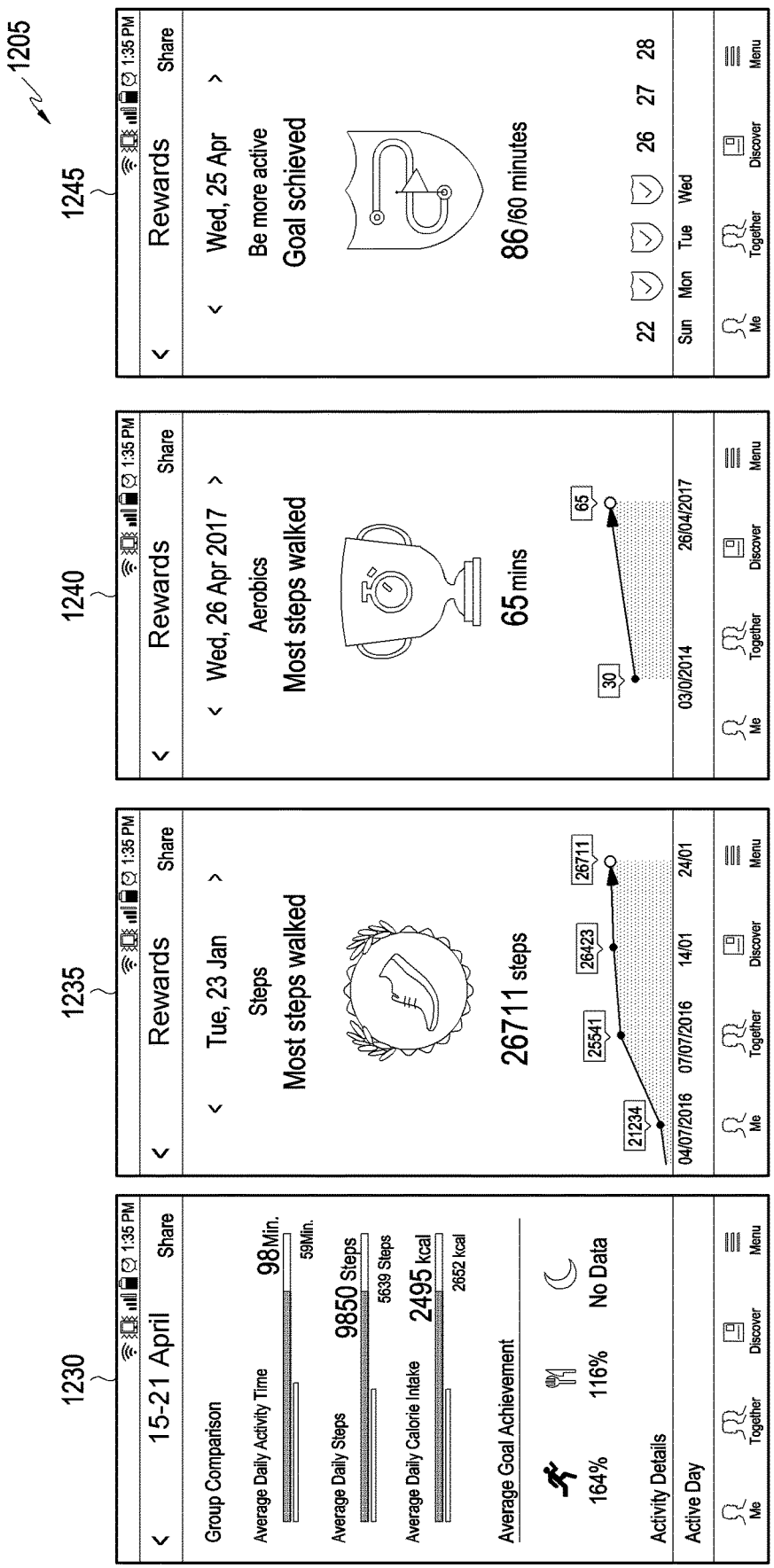

1230, 1235, 1240, and 1245 of FIG. 12C indicate screens where a user mission related to an exercise is registered and a mission progress state for compensation is displayed on the first application.

Among tasks of the first application, for a basic logic having much computation (e.g., weekly summary data generation, reward generation, etc.), upon completion of the computation at the time of displaying the screen, a sluggish state occurs on the screen or a loading time may increase.

According to an embodiment, a task for the basic logic having much computation may be registered and the registered task may be processed, thereby previously computing the basic logic. Hence, a processing delay of the first application may be prevented.

Figure 12D:
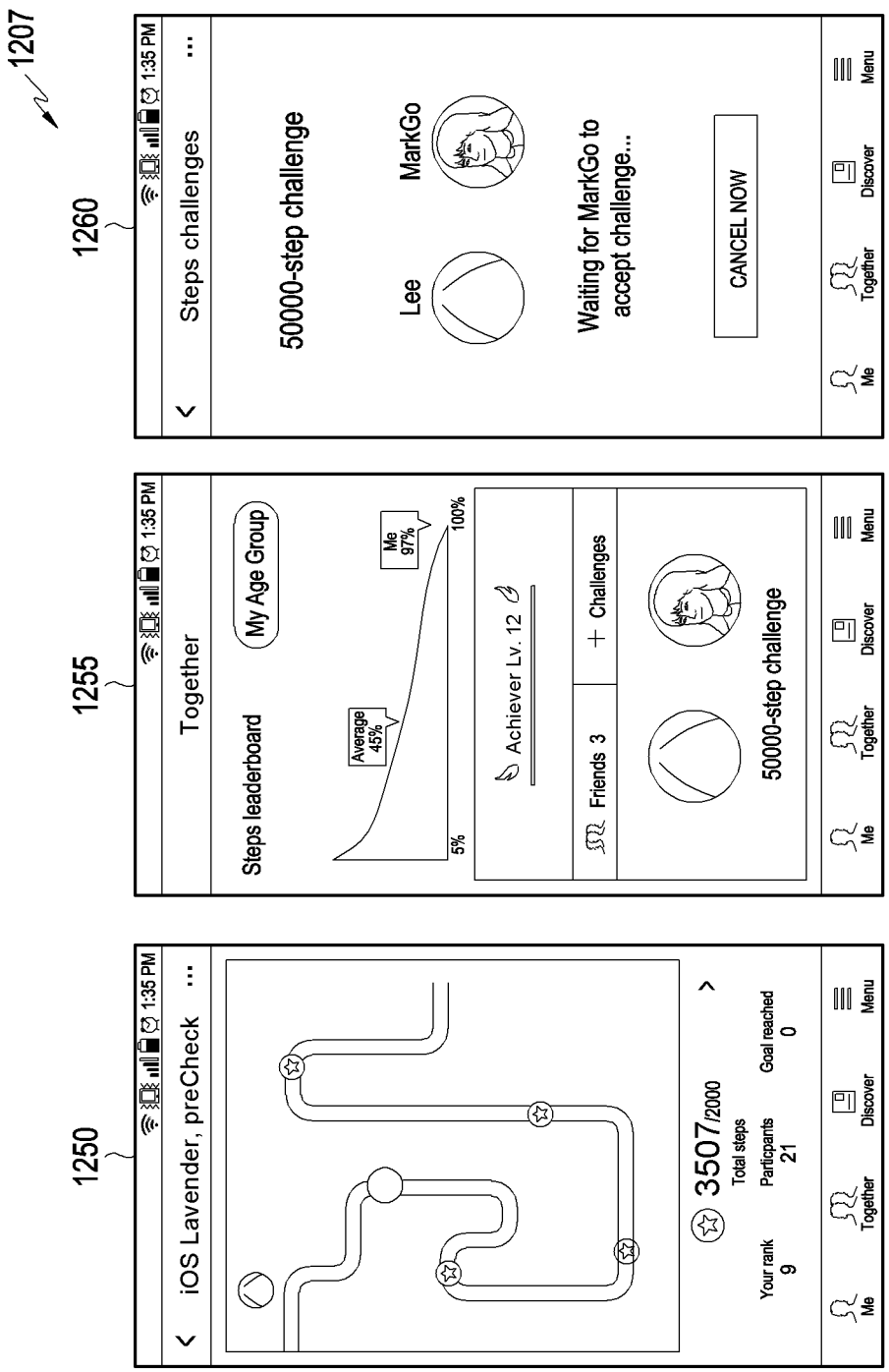

1250, 1255, and 1260 of FIG. 12D indicates screens where a user mission of competing for the number of steps with a friend is registered and a step number competition state is displayed on the first application.

According to an embodiment, by the background execution program 325 triggered periodically, in competition with the friend, the step data may be periodically synchronized with the external electronic device 370 and be computed, and a friend list may be periodically updated.

According to an embodiment, by the background execution program 325 triggered periodically, the first application may be periodically authorized by the external electronic device 370 and may maintain permission (prevent compulsory withdrawal).

Various embodiments may be used for general purposes when not only the above-described health application, but also various applications (e.g., a medical application for periodically monitoring a blood pressure or blood sugar, etc.) perform an essential operation (e.g., an operation that needs to be performed periodically) without a background limitation.

According to various embodiments, applications may implement a desired operation merely by registering a task to be processed by the background execution program 325 without separately their respective operations in the background.

For example, an application or data may be downloaded, periodically changed data may be read from the sensor or be uploaded, or complex computation may be performed in advance for display on the screen of the user interface without a delay. Even in the absence of an additional user interface or a separate user input for periodic data processing, a seamless scenario may be provided to the user by registering tasks.

FIGS. 13A, 13B, and 13C illustrate programs 1301, 1303, and 1305 for describing a push message transmitted from outside to process a task according to various embodiments.

1301 of FIG. 13A indicates a normal format of the push message. This push message may include a body 1315 (the body of the push message), and may be used for simple notifications without a subsequent operation. The push message may set a "content-available" value to "0 (false)" by using a first field 1310. The push message may have a feature that is subordinate to a particular operation. The push message may be displayed on the screen of the electronic device 301 and may be shown to the user.

In comparison with this, 1303 of FIG. 13B indicates a push message according to various embodiments. The push message for background task processing may be implemented as illustrated in FIG. 13B without a body by using a silent push that is not displayed on the screen. The push message may be intended to trigger the designated background execution program 325. The push message may be intended to change a state of the background execution program 325. The push message may be intended to process a background task. The push message may not be subordinate to a particular operation.

The push message may include a first field 1320 and set a "content-available" value to "1 (true)" by using the first field 1320, as illustrated in FIG. 13B. Upon reception of the push message, the designated background execution program 325 on the electronic device 301 may be triggered.

In a silent push condition, to change a configuration related to a particular application (e.g., to preferentially process a task registered by Application A by giving a higher priority to Application A), a push message including an additional parameter may be used as indicated by 1305 of FIG. 13C. The push message may include a first field 1330 for triggering the background execution program 325 and a second field 1335 for changing a parameter (e.g., a priority).

In a non-transient computer-readable storage medium having stored therein instructions according to various embodiments, the instructions, when executed by at least one processor of a computer including an operating system which provides, for at least one application program, an active state for operating in a foreground, a suspended state for operating in a background without executing a command, and a background state for operating in the background and executing a command, may cause the computer to store, for an application program configured to execute at least one task on the computer, information about the task in a memory of the computer, to receive a push message from an outside of the computer after the application program is changed from the active state to the suspended state, to change the application program from the suspended state to the background state upon reception of the push message, and to cause the application program to execute the task based on the information about the task in the background state.

According to various embodiments, the information about the task may include at least one of a period of execution of the task, a condition for execution of the task, a priority of execution of the task, or a dependency of the task on execution.

According to various embodiments, as the push message is received in every first periods, the task may be executed in every the first periods.

According to various embodiments, a transmission period of the push message may be set by an external electronic device.

According to various embodiments, a transmission period of the push message may be determined based on a state of the computer.

According to various embodiments, information about a plurality of tasks may be stored for a plurality of application programs, and the plurality of tasks may be executed based on the information about the plurality of tasks in a unit of a task, upon reception of the push message.

According to various embodiments, at least some of the plurality of tasks may be executed during a designated time designated by the operating system.

According to various embodiments, a task execution order of the plurality of tasks may be determined based on the information about the plurality of tasks, and the plurality of tasks may be executed according to the task execution order.

According to various embodiments, the information about the task may further include personalized information of a user.

According to various embodiments, the information about the task may be stored when the application program is initialized or when the application program enters the background state.

An electronic device including an operating system which provides, for at least one application program, an active state for operating in a foreground, a suspended state for operating in a background without executing a command, and a background state for operating in the background and executing a command according to various embodiments may include a communication circuit, a processor, and a memory. The memory may store instructions that, when executed, cause the processor to store, for an application program configured to execute at least one task on the electronic device, information about the task in the memory, to receive a push message from an outside of the electronic device through the communication circuit after the application program is changed from the active state to the suspended state, to change the application program from the suspended state to the background state upon reception of the push message, and to cause the application program to execute the task based on the information about the task in the background state.

According to various embodiments, the information about the task may include at least one of a period of execution of the task, a condition for execution of the task, a priority of execution of the task, or a dependency of the task on execution.

According to various embodiments, as the push message is received in every first periods, the task may be executed in every the first periods.

According to various embodiments, a transmission period of the push message may be set by an external electronic device.

According to various embodiments, a transmission period of the push message may be determined based on a state of the electronic device.

According to various embodiments, information about a plurality of tasks may be stored for a plurality of application programs, and the plurality of tasks may be executed based on the information about the plurality of tasks in a unit of a task, upon reception of the push message.

According to various embodiments, at least some of the plurality of tasks may be executed by the operating system during a designated time.

According to various embodiments, a task execution order of the plurality of tasks may be determined based on the information about the plurality of tasks, and the plurality of tasks may be executed according to the task execution order.

According to various embodiments, the information about the task may further include personalized information of a user.

According to various embodiments, the information about the task may be stored when the application program is initialized or when the application program enters the background state.

What is claimed is:

1. A non-transitory computer-readable storage medium having stored therein instructions,
    wherein the instructions, when executed by at least one processor of a computer comprising an operating system which provides, for at least one application program, an active state for operating in a foreground, a suspended state for operating in a background without executing a command, and a background state for operating in the background and executing a command, cause the computer to:
    identify, for an application program configured to execute at least one task on the computer, information about the at least one task stored in a memory of the computer;
    identify that an state of the application program is changed from the active state to the suspended state;
    receive, over a communication network, a push message from an external electronic device in the suspended state;
    change the state of the application program from the suspended state to the background state based on the reception of the push message;
    based on receiving the push message, control the application program to execute the at least one task based on the information about the at least one task during a first time period;
    identify whether it is possible to terminate the execution of the at least one task based on an expiration of the first time period;
    in response to identifying that it is impossible to terminate the execution of the at least one task, transmit, over the communication network, a request message to the external device for requesting the external electronic device to retransmit the push message, and change the state of the application program from the background state to the suspended state;
    in response to the transmitted request message, receive, over the communication network, the retransmitted push message from the external electronic device in the suspended state, wherein the push message is received from the external device periodically, and the retransmitted push and the previous push message are received in a same period;
    change the state of the application program from the suspended state to the background state based on the reception of the retransmitted push message;
    based on receiving the retransmitted push message, control the application program to execute the at least one task based on the information about the at least one task during a second time period;
    identify whether it is possible to terminate the execution of the at least one task based on an expiration of the second time period; and
    in response to identifying that it is possible to terminate the execution of the at least one task, terminate the execution of the at least one task and change the state of the application program from the background state to the suspended state.

2. The non-transitory computer-readable storage medium of claim 1, wherein the information about the at least one task comprises at least one of a period of execution of the at least one task, a condition for execution of the at least one task, a priority of execution of the at least one task, or a dependency of the at least one task on execution.

3. The non-transitory computer-readable storage medium of claim 1, wherein information about a plurality of tasks is stored for a plurality of application programs, and
    wherein the plurality of tasks are executed based on the information about the plurality of tasks in a unit of a task, upon the reception of the push message.

4. The non-transitory computer-readable storage medium of claim 1, wherein the first time period and the second time period are designated by the operating system.

5. The non-transitory computer-readable storage medium of claim 3, wherein a task execution order for each of the plurality of tasks is determined based on the information about the plurality of tasks, and
    wherein the plurality of tasks are executed based on the task execution order for each of the plurality of tasks.

6. The non-transitory computer-readable storage medium of claim 2, wherein the information about the at least one task further comprises personalized information of a user.

7. The non-transitory computer-readable storage medium of claim 1, wherein the information about the at least one task is stored in response to the application program being initialized or in response to the application program entering the background state.

8. An electronic device comprising an operating system which provides, for at least one application program, an active state for operating in a foreground, a suspended state for operating in a background without executing a command, and a background state for operating in the background and executing a command, the electronic device comprising:
    a communication circuit;
    at least one processor; and
    a memory,
    wherein the memory stores instructions that, when executed, cause the at least one processor to:
    identify, for an application program configured to execute at least one task on the electronic device, information about the at least one task stored in the memory;
    identify that an state of the application program is changed from the active state to the suspended state;
    receive, over a communication network, a push message from an external electronic device through the communication circuit in the suspended state;

change the state of the application program from the suspended state to the background state based on the reception of the push message; and based on receiving the push message, control the application program to execute the task based on the information about the at least one task during a first time period;

identify whether it is possible to terminate the execution of the at least one task based on an expiration of the first time period;

in response to identifying that it is impossible to terminate the execution of the at least one task, transmit, over the communication network, a request message to the external device for requesting the external electronic device to retransmit the push message, and change the state of the application program from the background state to the suspended state;

in response to the transmitted request message, receive, over the communication network, the retransmitted push message from the external electronic device through the communication circuit in the suspended state, wherein the push message is received from the external device periodically, and the retransmitted push and the previous push message are received in a same period;

change the state of the application program from the suspended state to the background state based on the reception of the retransmitted push message;

based on receiving the retransmitted push message, control the application program to execute the at least one task based on the information about the at least one task during a second time period;

identify whether it is possible to terminate the execution of the at least one task based on an expiration of the second time period; and in response to identifying that it is possible to terminate the execution of the at least one task, terminate the execution of the at least one task and change the state of the application program from the background state to the suspended state.

9. The electronic device of claim 8, wherein the information about the at least one task comprises at least one of a period of execution of the at least one task, a condition for execution of the at least one task, a priority of execution of the at least one task, or a dependency of the at least one task on execution.

10. The electronic device of claim 8, wherein information about a plurality of tasks is stored for a plurality of application programs, and
wherein the plurality of tasks are executed based on the information about the plurality of tasks in a unit of a task, upon the reception of the push message.

11. The electronic device of claim 8, wherein the first time period and the second time period are designated by the operating system.

12. The electronic device of claim 10, wherein a task execution order for each of the plurality of tasks is determined based on the information about the plurality of tasks, and
wherein the plurality of tasks are executed based on the task execution order for each of the plurality of tasks.

13. The electronic device of claim 9, wherein the information about the at least one task further comprises personalized information of a user.

14. The electronic device of claim 8, wherein the information about the at least one task is stored in response to the application program being initialized or in response to the application program entering the background state.

* * * * *